US010852873B2

(12) United States Patent
Liu et al.

(10) Patent No.: US 10,852,873 B2
(45) Date of Patent: Dec. 1, 2020

(54) PRESSURE-SENSITIVE DETECTION APPARATUS, ELECTRONIC DEVICE, AND TOUCH DISPLAY SCREEN

(71) Applicant: HUAWEI TECHNOLOGIES CO., LTD., Guangdong (CN)

(72) Inventors: Jiang Liu, Shenzhen (CN); Jingdong Wu, Shenzhen (CN); Zeshi Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 31 days.

(21) Appl. No.: 16/234,108

(22) Filed: Dec. 27, 2018

(65) Prior Publication Data

US 2019/0129557 A1  May 2, 2019

Related U.S. Application Data

(63) Continuation of application No. PCT/CN2017/087575, filed on Jun. 8, 2017.

(30) Foreign Application Priority Data

Jun. 30, 2016  (CN) ........................ 2016 1 0507150

(51) Int. Cl.
  *G06F 3/041* (2006.01)
(52) U.S. Cl.
  CPC ............ *G06F 3/0414* (2013.01); *G06F 3/041* (2013.01); *G06F 3/0412* (2013.01); *G06F 2203/04105* (2013.01)
(58) Field of Classification Search
  CPC ...... G06F 3/0414; G06F 3/0412; G06F 3/041; G06F 2203/04105
  See application file for complete search history.

(56) References Cited

U.S. PATENT DOCUMENTS 9,542,028 B2 * 1/2017 Filiz ........................ G06F 3/044
10,585,480 B1 * 3/2020 Bushnell ................. G06F 3/016
(Continued)

FOREIGN PATENT DOCUMENTS

CN   102768291 A   11/2012
CN   103162875 A   6/2013
(Continued)

OTHER PUBLICATIONS

Dinh et al., "Temperature-Compensated Force/Pressure Sensor Based on Multi-Walled Carbon Nanotube Epoxy Composites," Sensors, vol. 15, No. 5, May 12, 2015, XP055583131, 20 pages.
(Continued)

*Primary Examiner* — Grant Sitta
(74) *Attorney, Agent, or Firm* — Fish & Richardson P.C.

(57) ABSTRACT

The present disclosure relates to pressure-sensitive detection apparatus. One example apparatus includes a pressure sensor array located in a touch display screen. One half-bridge circuit is constituted in each row of the pressure sensor array. When there is a touch input signal on the touch display screen, a first half-bridge circuit and a second half-bridge circuit corresponding to a touch location of the touch input signal output signals. A deformation amount generated when pressure is applied to a first pressure sensor component in the first half-bridge circuit is less than a deformation amount generated when the pressure is applied to a second pressure sensor component in the first half-bridge circuit, and a deformation amount generated when the pressure is applied to a first pressure sensor component in the second half-bridge circuit is greater than a deformation amount generated when the pressure is applied to a second pressure sensor component in the second half-bridge circuit.

20 Claims, 12 Drawing Sheets

(56) References Cited

U.S. PATENT DOCUMENTS

| | | | |
|---|---|---|---|
| 2007/0248799 A1* | 10/2007 | DeAngelis | G01L 1/146 428/209 |
| 2009/0309616 A1* | 12/2009 | Klinghult | G06F 3/044 324/686 |
| 2009/0315845 A1* | 12/2009 | Alexander | H03K 17/9622 345/173 |
| 2010/0123468 A1 | 5/2010 | Kim et al. | |
| 2010/0123686 A1 | 5/2010 | Klinghult et al. | |
| 2010/0156846 A1* | 6/2010 | Long | G06F 3/044 345/174 |
| 2010/0164899 A1* | 7/2010 | Wu | G06F 3/045 345/174 |
| 2010/0201635 A1* | 8/2010 | Klinghult | G06F 3/0414 345/173 |
| 2010/0259503 A1* | 10/2010 | Yanase | G06F 3/0416 345/174 |
| 2011/0248728 A1* | 10/2011 | Maruyama | G06F 3/041 324/658 |
| 2012/0086667 A1* | 4/2012 | Coni | G06F 3/0416 345/174 |
| 2013/0009905 A1* | 1/2013 | Castillo | G06F 3/044 345/174 |
| 2015/0261371 A1 | 9/2015 | Li et al. | |
| 2015/0331517 A1* | 11/2015 | Filiz | G06F 3/044 345/173 |
| 2017/0220180 A1 | 8/2017 | Lu et al. | |
| 2017/0242518 A1 | 8/2017 | Liu et al. | |
| 2017/0315653 A1* | 11/2017 | Vandermeijden | G06F 3/0416 |
| 2018/0024687 A1 | 1/2018 | Yang et al. | |
| 2018/0195922 A1* | 7/2018 | Oono | H01L 41/1136 |
| 2018/0322323 A1* | 11/2018 | Ran | G06F 3/041 |

FOREIGN PATENT DOCUMENTS

| | | |
|---|---|---|
| CN | 104823138 A | 8/2015 |
| CN | 204883660 U | 12/2015 |
| CN | 105677111 A | 6/2016 |
| CN | 105677112 A | 6/2016 |
| CN | 106020559 A | 10/2016 |

OTHER PUBLICATIONS

Extended European Search Report issued in European Application No. 17819061.7 dated May 7, 2019, 10 pages.

International Search Report and Written Opinion issued in International Application No. PCT/CN2017/087575 dated Jul. 27, 2017, 22 pages.

* cited by examiner

600

Determine a touch location of a touch input signal on a touch display screen  ~ S610

Determine, based on the touch location, a first half-bridge circuit and a second half-bridge circuit in a pressure sensor array that are corresponding to the touch location, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit  ~ S620

Obtain an output signal of a target full-bridge circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a sampled touch location on the touch display screen, and a value relationship between a pressure value of a sampled touch input signal at the sampled touch location and an output signal of a sampled full-bridge circuit corresponding to the sampled touch location  ~ S630

FIG. 18

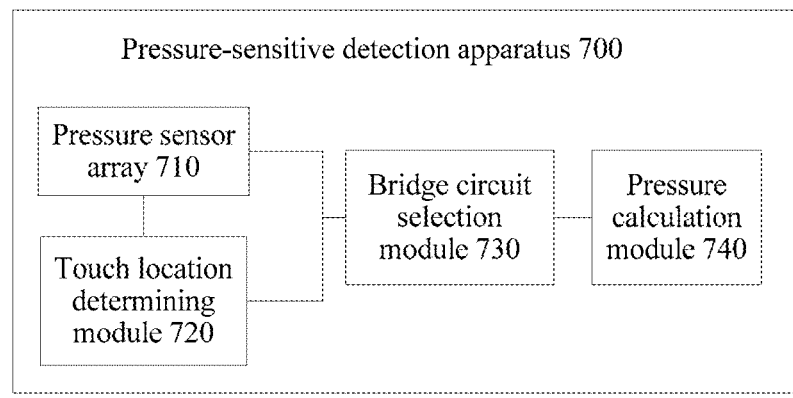

FIG. 19

PRESSURE-SENSITIVE DETECTION APPARATUS, ELECTRONIC DEVICE, AND TOUCH DISPLAY SCREEN

CROSS-REFERENCE TO RELATED APPLICATIONS

This application is a continuation of International Application No. PCT/CN2017/087575, filed on Jun. 8, 2017, which claims priority to Chinese Patent Application No. 201610507150.0, filed on Jun. 30, 2016. The disclosures of the aforementioned applications are hereby incorporated by reference in their entireties.

TECHNICAL FIELD

Embodiments of the present disclosure relate to the field of electronic devices, and more specifically, to a pressure-sensitive detection apparatus, an electronic device, and a touch display screen.

BACKGROUND

As an intuitive and convenient input manner of a computer or other data processing devices, touchscreen input is widely applied to various electronic devices, especially to a mobile electronic device. Currently, touch-sensitive technologies include a capacitive touch-sensitive technology, a resistive touch-sensitive technology, an electromagnetic touch-sensitive technology, an infrared touch-sensitive technology, an ultrasonic-wave touch-sensitive technology, and the like. All existing touch-sensitive technologies can be used to probe single-point or multi-point touch input that is mainly limited to a touch location on an XY plane of a touchscreen. With continuous development of touchscreen technologies, an ideal touchscreen needs to be capable of sensing not only a touch location on an XY plane of the touchscreen but also a value of touch pressure in a Z-axis direction of the touchscreen, so as to add a degree of freedom to touch input.

A conventional touchscreen pressure-sensitive solution is an electromagnetic pressure-sensitive solution. In this solution, high precision is achieved, but an operation needs to be performed by using an additional matching electromagnetic stylus rather than directly using a finger. In view of this, a capacitive pressure-sensitive solution is put forward in the prior art: After a plate of a detection capacitor is pressed due to a force, the plate is deformed. Therefore, an inter-plate distance is changed, and then a capacitance of the detection capacitor is changed. In this case, a pressure value is obtained through inverse extrapolation by measuring the capacitance of the detection capacitor. However, in this solution, it is likely to be interfered with by a current capacitive touchscreen, causing low resolution, and a complex drive circuit needs to be designed, causing an increase in costs of this solution.

Conventional touchscreen pressure-sensitive solutions may further include a piezoresistive pressure-sensitive solution and a piezoelectric pressure-sensitive solution. When a detection unit is pressed due to a force, impedance and a voltage of a sensor are changed. In this case, a pressure value is obtained through inverse extrapolation by detecting changes of the impedance and the voltage. Because the detection unit is deformed to an extremely small degree, and an electrical signal obtained after conversion is extremely small and is likely to be drowned by noise, sensitivity is not sufficiently good and resolution is not sufficiently high. In an existing manner, an electrical signal is amplified by applying structural mechanics, to improve a signal-to-noise ratio. However, thickness is likely to be increased in this manner, and this manner is likely to be affected by a structural processing error and consequently subsequent calibration is relatively troublesome.

SUMMARY

Embodiments of the present invention provide a pressure-sensitive detection apparatus, an electronic device, and a touch display screen, so as to effectively improve pressure-sensitive detection sensitivity and precision.

A first aspect provides a pressure-sensitive detection apparatus, including:

a pressure sensor array, where each row of the pressure sensor array includes M pressure sensors, the M pressure sensors constitute one half-bridge circuit, the half-bridge circuit includes a first pressure sensor unit and a second pressure sensor unit, a first terminal of the first pressure sensor unit is connected to a power supply, a second terminal of the first pressure sensor unit is connected to a first terminal of the second pressure sensor unit, a second terminal of the second pressure sensor unit is connected to the ground, the second terminal of the first pressure sensor unit is an output terminal of the half-bridge circuit, the first pressure sensor unit and the second pressure sensor unit each include one or more pressure sensors, and M is an integer greater than 2, where the pressure sensor array is located in a touch display screen, and pressure of a touch input signal on the touch display screen is transferred to the pressure sensor array; and when there is a touch input signal on the touch display screen, a first half-bridge circuit and a second half-bridge circuit in the pressure sensor array that are corresponding to a touch location of the touch input signal output signals, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit.

Because the deformation amount generated when the pressure is applied to the first pressure sensor unit in the first half-bridge circuit is less than the deformation amount generated when the pressure is applied to the second pressure sensor unit in the first half-bridge circuit, an output signal $V11$ of the first half-bridge circuit is greater than a signal $V10$ that is output by the first half-bridge circuit when no pressure is applied to the first half-bridge circuit, namely, $V11=V10+\Delta V1$ ($\Delta V1>0$). Because the deformation amount generated when the pressure is applied to the first pressure sensor unit in the second half-bridge circuit is greater than the deformation amount generated when the pressure is applied to the second pressure sensor unit in the second half-bridge circuit, an output signal $V21$ of the second half-bridge circuit is less than a signal $V20$ that is output by the second half-bridge circuit when no pressure is applied to the second half-bridge circuit, namely, $V21=V20\Delta V2$ ($\Delta V2>0$). It should be understood that, when there is no touch input signal on the touch display screen (namely, no pressure is applied to the pressure sensor array), the output signal of the first half-bridge circuit is equal to the output signal of the second half-bridge circuit, namely, V10=V20. In this case, a difference between the output signal of the first half-bridge circuit and the output signal of the second half-bridge circuit is V11−V12=ΔV1+ΔV2. The signal ΔV1 reflects a pressure strain effect of the touch input signal on the first half-bridge circuit, and the signal ΔV2 reflects a pressure strain effect of the touch input signal on the second half-bridge circuit. Therefore, the difference (ΔV1+ΔV2) between the output signals of the first half-bridge circuit and the second half-bridge circuit reflects a superposition effect of the pressure strain effects of the touch input signal on the first half-bridge circuit and the second half-bridge circuit. Therefore, the pressure-sensitive detection apparatus provided in this embodiment of the present invention can amplify a pressure-sensitive effect of the touch input signal on the touch display screen, so that sensitivity and precision of pressure-sensitive detection of the touch input signal can be improved.

It should be understood that, the horizontal of the pressure sensor array at a first location is defined as a row, and the vertical of the pressure sensor array is defined as a column. When the pressure sensor array is at a second location after being rotated through 90 degrees, a row is corresponding to the column at the first location, and a column is corresponding to the row at the first location. It is assumed that the pressure sensor array is at the first location in all descriptions of this specification. When the pressure sensor array is at the second location, descriptions of rows are correspondingly changed to descriptions of columns. In conclusion, using "row" to describe the pressure sensor array in the embodiments of the present disclosure constitutes no limitation on the protection scope of the embodiments of the present invention.

With reference to the first aspect, in a first possible implementation of the first aspect, the first half-bridge circuit has a largest deformation amount difference in the pressure sensor array, where the deformation amount difference indicates a difference between a deformation amount of the first pressure sensor unit and a deformation amount of the second pressure sensor unit in a same half-bridge circuit.

It should be understood that, the first half-bridge circuit has the largest deformation amount difference in the pressure sensor array, and this indicates that a row in which the first half-bridge circuit is located is a row closest to the touch location.

In the technical solution of the present invention, the first half-bridge circuit has the largest deformation amount difference in the pressure sensor array, and therefore there is a relatively large difference (ΔV1+ΔV2) between the output signal V11 of the first half-bridge circuit and the output signal V12 of the second half-bridge circuit. Therefore, a pressure-sensitive signal of the touch input signal on the touch display screen can be more effectively amplified, so that pressure-sensitive detection precision and sensitivity can be further improved.

With reference to the first possible implementation of the first aspect, in a second possible implementation of the first aspect, the second half-bridge circuit has a largest deformation amount difference among half-bridge circuits other than the first half-bridge circuit in the pressure sensor array.

It should be understood that, the second half-bridge circuit has the largest deformation amount difference among the half-bridge circuits other than the first half-bridge circuit in the pressure sensor array, and this indicates that other than the row in which the first half-bridge circuit is located, a row in which the second half-bridge circuit is located is a row closest to the touch location. Namely, the first half-bridge circuit has the largest deformation amount difference in the pressure sensor array, and the second half-bridge circuit has the second largest deformation amount difference in the pressure sensor array. Therefore, the difference (ΔV1+ΔV2) between the output signal V11 of the first half-bridge circuit and the output signal V12 of the second half-bridge circuit is greater than a difference between output signals of any other two half-bridge circuits in the pressure sensor array. In other words, the difference (ΔV1+ΔV2) between the output signal of the first half-bridge circuit and the output signal of the second half-bridge circuit amplifies the pressure-sensitive signal of the touch input signal to a maximum degree. Therefore, the pressure-sensitive detection apparatus provided in this embodiment of the present invention can effectively improve pressure-sensitive detection sensitivity and precision.

With reference to the first aspect, or the first or the second possible implementation of the first aspect, in a third possible implementation of the first aspect, in a half-bridge circuit in an $i^{th}$ row of the pressure sensor array, the first pressure sensor unit and the second pressure sensor unit are respectively located in the middle and on both sides of the $i^{th}$ row; and in a half-bridge circuit in a $j^{th}$ row of the pressure sensor array, the first pressure sensor unit and the second pressure sensor unit are respectively located on a left side and a right side of the $j^{th}$ row, where the $i^{th}$ row and the $j^{th}$ row are any two adjacent rows of the pressure sensor array.

Specifically, for example, in the half-bridge circuit in the $i^{th}$ row of the pressure sensor array, the first pressure sensor unit is located in the middle of the $i^{th}$ row, and the second pressure sensor unit is located on the both sides on edges of the $i^{th}$ row; or the first pressure sensor unit is located on the both sides on edges of the $i^{th}$ row, and the second pressure sensor unit is located in the middle of the $i^{th}$ row. For another example, in the half-bridge circuit in the $j^{th}$ row of the pressure sensor array, the first pressure sensor unit is located on the left side of the $j^{th}$ row, and the second pressure sensor unit is located on the right side of the $j^{th}$ row; or the first pressure sensor unit is located on the right side of the $j^{th}$ row, and the second pressure sensor unit is located on the left side of the $j^{th}$ row. It should be understood that, based on such an arrangement manner, both a pressure signal from the middle of the touch display screen and a pressure signal from an edge of the display screen can be more sensitively and accurately detected, so that sensitivity and precision of pressure-sensitive detection on the display screen can be effectively improved.

With reference to the third possible implementation of the first aspect, in a fourth possible implementation of the first aspect, the pressure sensor array has at least four rows, where in a half-bridge circuit in an $a^{th}$ row, the first pressure sensor unit is located in the middle of the $a^{th}$ row, and the second pressure sensor unit is located on both sides on edges of the $a^{th}$ row; in a half-bridge circuit in an $(a+2)^{th}$ row, the first pressure sensor unit is located on both sides on edges of the $(a+2)^{th}$ row, and the second pressure sensor unit is located in the middle of the $a^{th}$ row, where a is 1 or 2; in half-bridge circuits in two rows other than the $a^{th}$ row and the $(a+2)^{th}$ row in four rows, the first pressure sensor unit and the second pressure sensor unit are arranged in a "left side plus right side" manner, where in one half-bridge circuit, the first pressure sensor unit is located on a left side, and the second pressure sensor unit is located on a right side; and in the other half-bridge circuit, the first pressure sensor unit is located on a right side, and the second pressure sensor unit is located on a left side.

With reference to any one of the first aspect, or the first to the fourth possible implementations of the first aspect, in a fifth possible implementation of the first aspect, the pressure-sensitive detection apparatus further includes:

a switch circuit, where the switch circuit includes a plurality of switch components that are in a one-to-one correspondence to a plurality of half-bridge circuits in the pressure sensor array, a first switch component corresponding to the first half-bridge circuit is closed, a second switch component corresponding to the second half-bridge circuit is closed, and all switch components corresponding to remaining half-bridge circuits are open, so that the first half-bridge circuit and the second half-bridge circuit that are related to the touch location output the signals.

In the pressure-sensitive detection apparatus provided in this embodiment of the present invention, the switch components are connected to output terminals of the half-bridge circuits in the pressure sensor array, so that a quantity of cables in an entire circuit can be effectively reduced, thereby reducing circuit costs. In addition, for the determined touch location, only the first half-bridge circuit and the second half-bridge circuit rather than all the half-bridge circuits in the pressure sensor array are activated by using the switch circuit, so that circuit energy consumption can be effectively reduced.

With reference to the fifth possible implementation of the first aspect, in a sixth possible implementation of the first aspect, the switch circuit includes control terminals, and control signals of the control terminals are used to:

control the first switch component and the second switch component to be closed, and control all the switch components corresponding to the remaining half-bridge circuits to be open.

With reference to any one of the first aspect or the implementations of the first aspect, in a seventh possible implementation of the first aspect, the pressure sensor is a piezoresistive pressure sensor or a piezoelectric pressure sensor.

It should be understood that, when the piezoresistive pressure sensor or the piezoelectric pressure sensor rather than a capacitive pressure sensor used in an existing pressure detection technology is used as a pressure strain component, thickness of a pressure detection device can be effectively reduced, so that the pressure detection device has a small size and a relatively simple structure.

With reference to the seventh possible implementation of the first aspect, in an eighth possible implementation of the first aspect, a pressure strain medium of the pressure sensor is of a serpentine maze layout type.

In the pressure-sensitive detection apparatus provided in this embodiment of the present invention, the pressure strain medium of the pressure sensor is of the serpentine maze layout type, and the serpentine maze layout type includes an X-direction layout type and a Y-direction layout type. Therefore, the pressure sensor can sense both a change in a vertical direction and a change in a horizontal direction, and can achieve relatively good sensing regardless of a pressure strain generation direction, so that pressure detection sensitivity is improved. In addition, this pressure sensor that is of the serpentine maze layout type is similar to a spring structure, and can achieve excellent release strain regardless of a stretch generation direction. Therefore, an anti-stretch capability can be effectively improved, thereby improving product reliability.

With reference to any one of the first aspect or the implementations of the first aspect, in a ninth possible implementation of the first aspect, the pressure-sensitive detection apparatus further includes:

a differential amplifier, where two input terminals of the differential amplifier are connected to an output terminal of the first half-bridge circuit and an output terminal of the second half-bridge circuit in a one-to-one manner.

In this embodiment of the present invention, the differential amplifier is connected to the output terminals of the first half-bridge circuit and the second half-bridge circuit, to perform differential amplification processing on the output signals (namely, V11 and V12) of the first half-bridge circuit and the second half-bridge circuit. Therefore, the pressure-sensitive signal of the touch input signal can be further amplified, so that pressure-sensitive detection precision and sensitivity can be improved.

With reference to the ninth possible implementation of the first aspect, in a tenth possible implementation of the first aspect, the pressure-sensitive detection apparatus further includes:

a filter circuit, where an input terminal of the filter circuit is connected to an output terminal of the differential amplifier; and an analog-to-digital conversion ADC circuit, where an input terminal of the ADC circuit is connected to an output terminal of the filter circuit.

With reference to the tenth possible implementation of the first aspect, in an eleventh possible implementation of the first aspect, the pressure-sensitive detection apparatus further includes:

a processing circuit component, configured to: obtain an output signal of a target full-bridge circuit based on an output signal of the ADC circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

In the pressure-sensitive detection apparatus provided in this embodiment of the present invention, when there is the touch input signal on the touch display screen, the first half-bridge circuit and the second half-bridge circuit in the pressure sensor array that are corresponding to the touch location of the touch input signal output the signals. Neither the deformation amount difference of the first half-bridge circuit nor the deformation amount difference of the second half-bridge circuit is 0, and the difference between the output signal of the first half-bridge circuit and the output signal of the second half-bridge circuit is not 0, either. Therefore, the target full-bridge circuit including the first half-bridge circuit and the second half-bridge circuit can amplify the pressure-sensitive signal of the touch input signal. The pressure value of the touch input signal is calculated based on the output signal of the target full-bridge circuit, so that pressure-sensitive detection precision and sensitivity can be improved.

With reference to the eleventh possible implementation of the first aspect, in a twelfth possible implementation of the first aspect, the processing circuit component is further configured to: before calculating the pressure value of the touch input signal based on the output signal of the target full-bridge circuit, the touch location, and the pressure calculation model, obtain, from a sampled touch location on the touch display screen, a sampled touch input signal that has a known pressure value, select, from the pressure sensor array, a sampled full-bridge circuit of the sampled touch location, and establish the pressure calculation model based on the sampled touch location, the pressure value of the sampled touch input signal, and an output signal of the sampled full-bridge circuit.

Specifically, a plurality of sampled touch locations may be determined on the touch display screen. Corresponding to different sampled touch locations, different sampled full-bridge circuits may be selected for measurement. Alternatively, corresponding to a same sampled touch location, different sampled full-bridge circuits may be selected for a plurality of times of measurement. Alternatively, based on a touch input signal at a same touch location, different sampled full-bridge circuits may be selected for a plurality of times of measurement, to measure an output signal of each half-bridge circuit in the pressure sensor array. Then, the pressure calculation model is established based on the sampled touch location, the pressure value of the touch input signal, and the output signal of the full-bridge circuit (or half-bridge circuits).

Therefore, the pressure-sensitive detection apparatus provided in this embodiment of the present invention pre-establishes the pressure calculation model, and when the touch location of the touch input signal on the touch display screen is determined, determines the first half-bridge circuit and the second half-bridge circuit based on the touch location, and calculates the pressure value of the touch input signal based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

A second aspect provides a pressure-sensitive detection apparatus, including:

a pressure sensor array, located in a touch display screen, where pressure of a touch input signal on the touch display screen is transferred to the pressure sensor array, each row of the pressure sensor array includes M pressure sensors, the M pressure sensors constitute one half-bridge circuit, the half-bridge circuit includes a first pressure sensor unit and a second pressure sensor unit, a first terminal of the first pressure sensor unit is connected to a power supply, a second terminal of the first pressure sensor unit is connected to a first terminal of the second pressure sensor unit, a second terminal of the second pressure sensor unit is connected to the ground, the second terminal of the first pressure sensor unit is an output terminal of the half-bridge circuit, the first pressure sensor unit and the second pressure sensor unit each include one or more pressure sensors, and M is an integer greater than 2; and a switch circuit, including a plurality of switch components that are in a one-to-one correspondence to a plurality of half-bridge circuits in the pressure sensor array, where the switch circuit further includes control terminals, and control signals of the control terminals are used to: when there is a touch input signal on the touch display screen, control a first switch component corresponding to a first half-bridge circuit and a second switch component corresponding to a second half-bridge circuit to be closed, where the first half-bridge circuit and the second half-bridge circuit in the pressure sensor array are corresponding to a touch location of the touch input signal; and control all switch components corresponding to remaining half-bridge circuits to be open, so that the first half-bridge circuit and the second half-bridge circuit output signals, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit.

When the touch location of the touch input signal on the display screen is determined, the pressure-sensitive detection apparatus provided in this embodiment of the present invention activates the first half-bridge circuit and the second half-bridge circuit rather than all the half-bridge circuits in the pressure sensor array by using the control signals of the control terminals of the switch circuit, so that circuit energy consumption can be effectively reduced. In addition, the switch circuit is connected to output terminals of the half-bridge circuits in the pressure sensor array, so that a quantity of cables in an entire circuit can be effectively reduced, thereby reducing circuit costs. In addition, when there is the touch input signal on the touch display screen, the first half-bridge circuit and the second half-bridge circuit in the pressure sensor array that are corresponding to the touch location of the touch input signal are controlled to output the signals. Neither a deformation amount difference of the first half-bridge circuit nor a deformation amount difference of the second half-bridge circuit is 0, and a difference between an output signal of the first half-bridge circuit and an output signal of the second half-bridge circuit is not 0, either. Therefore, a full-bridge circuit including the first half-bridge circuit and the second half-bridge circuit can amplify a pressure-sensitive signal of the touch input signal. Therefore, the pressure-sensitive detection apparatus provided in this embodiment of the present invention can effectively improve sensitivity and precision of pressure-sensitive detection on the touchscreen.

The pressure sensor array in the second aspect is the pressure sensor array according to any one of the first aspect, or the first to the eighth implementations of the first aspect. For a detailed description, refer to the foregoing descriptions. For brevity, details are not described herein again.

With reference to the second aspect, in a first possible implementation of the second aspect, the pressure-sensitive detection apparatus further includes:

a differential amplifier, where two input terminals of the differential amplifier are connected to an output terminal of the first half-bridge circuit and an output terminal of the second half-bridge circuit in a one-to-one manner by using the switch circuit.

In the technical solution of the present invention, the differential amplifier is connected to the output terminals of the first half-bridge circuit and the second half-bridge circuit, to perform differential amplification processing on the output signals (namely, $V_{11}$ and $V_{12}$) of the first half-bridge circuit and the second half-bridge circuit. Therefore, the pressure-sensitive signal of the touch input signal can be further amplified, so that pressure-sensitive detection precision and sensitivity can be improved.

With reference to the first possible implementation of the second aspect, in a second possible implementation of the second aspect, the pressure-sensitive detection apparatus further includes:

a filter circuit, where an input terminal of the filter circuit is connected to an output terminal of the differential amplifier; and an analog-to-digital conversion ADC circuit, where an input terminal of the ADC circuit is connected to an output terminal of the filter circuit.

With reference to the second possible implementation of the second aspect, in a third possible implementation of the second aspect, the pressure-sensitive detection apparatus further includes:

a processing circuit component, configured to: obtain an output signal of a target full-bridge circuit based on an output signal of the ADC circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

In the pressure-sensitive detection apparatus provided in this embodiment of the present invention, when there is the touch input signal on the touch display screen, the first half-bridge circuit and the second half-bridge circuit in the pressure sensor array that are corresponding to the touch location of the touch input signal output the signals. Neither the deformation amount difference of the first half-bridge circuit nor the deformation amount difference of the second half-bridge circuit is 0, and the difference between the output signal of the first half-bridge circuit and the output signal of the second half-bridge circuit is not 0, either. Therefore, the target full-bridge circuit including the first half-bridge circuit and the second half-bridge circuit can amplify the pressure-sensitive signal of the touch input signal. The pressure value of the touch input signal is calculated based on the output signal of the target full-bridge circuit, so that pressure-sensitive detection precision and sensitivity can be improved.

With reference to the third possible implementation of the second aspect, in a fourth possible implementation of the second aspect, the processing circuit component is further configured to: before calculating the pressure value of the touch input signal based on the output signal of the target full-bridge circuit, the touch location, and the pressure calculation model, obtain, from a sampled touch location on the touch display screen, a sampled touch input signal that has a known pressure value, select, from the pressure sensor array, a sampled full-bridge circuit of the sampled touch location, and establish the pressure calculation model based on the sampled touch location, the pressure value of the sampled touch input signal, and an output signal of the sampled full-bridge circuit.

Therefore, the pressure-sensitive detection apparatus provided in this embodiment of the present invention pre-establishes the pressure calculation model, and when the touch location of the touch input signal on the touch display screen is determined, determines the first half-bridge circuit and the second half-bridge circuit based on the touch location, and calculates the pressure value of the touch input signal based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

A third aspect provides a touch display screen, where the touch display screen includes a display screen coverage layer, a display screen display module, a touch input pad, and the pressure-sensitive detection apparatus according to the first aspect or any possible implementation of the first aspect, the pressure-sensitive detection apparatus is located in a support structure inside the display screen, and the touch input pad is configured to: obtain a touch input signal on the display screen, and determine a touch location of the touch input signal.

The touch display screen provided in this embodiment of the present invention can improve pressure-sensitive detection precision and sensitivity.

With reference to the third aspect, in a first possible implementation of the third aspect, the pressure sensor array included in the pressure-sensitive detection apparatus is located between the display screen coverage layer and the display screen display module, or the display screen display module is located between the display screen coverage layer and the pressure sensor array.

It should be understood that, the pressure sensor array is fitted to the support structure inside the display screen. For example, the pressure sensor array is fitted to the display screen coverage layer or the display screen display module.

A fourth aspect provides an electronic device, and the electronic device includes a processing circuit component and the pressure-sensitive detection apparatus provided in the first aspect, where the processing circuit component is configured to: when there is a touch input signal on the touch display screen, trigger a first half-bridge circuit and a second half-bridge circuit in the pressure sensor array that are corresponding to a touch location of the touch input signal, to output signals, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit; and the processing circuit component is further configured to: obtain an output signal of a target full-bridge circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

The electronic device provided in this embodiment of the present invention determines, based on the touch location of the touch input signal on the touch display screen, the first half-bridge circuit and the second half-bridge circuit in the pressure sensor array that are corresponding to the touch location. Neither a deformation amount difference of the first half-bridge circuit nor a deformation amount difference of the second half-bridge circuit is 0, and a difference between an output signal of the first half-bridge circuit and an output signal of the second half-bridge circuit is not 0, either. Therefore, the target full-bridge circuit including the first half-bridge circuit and the second half-bridge circuit can amplify a pressure-sensitive signal of the touch input signal. The pressure value of the touch input signal is calculated based on the output signal of the target full-bridge circuit, so that pressure-sensitive detection precision and sensitivity can be improved. Therefore, the electronic device provided in this embodiment of the present invention can effectively improve sensitivity and precision of pressure-sensitive detection on the touchscreen.

With reference to the fourth aspect, in a first possible implementation of the fourth aspect, the processing circuit component is configured to determine, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

With reference to the first possible implementation of the fourth aspect, in a second possible implementation of the fourth aspect, the processing circuit component is configured to determine, as the second half-bridge circuit, a half-bridge circuit that has a largest deformation amount difference among half-bridge circuits other than the first half-bridge circuit in the pressure sensor array.

With reference to the fourth aspect, or the first or the second possible implementation of the fourth aspect, in a third possible implementation of the fourth aspect, the processing circuit component is further configured to: before calculating the pressure value of the touch input signal based on the output signal of the target full-bridge circuit, the touch location, and the pressure calculation model, obtain, from a sampled touch location on the touch display screen, a sampled touch input signal that has a known pressure value, select, from the pressure sensor array, a sampled full-bridge circuit corresponding to the sampled touch location, and establish the pressure calculation model based on the sampled touch location, the pressure value of the sampled touch input signal, and an output signal of the sampled full-bridge circuit.

Therefore, the electronic device provided in this embodiment of the present invention pre-establishes the pressure calculation model, and when the touch location of the touch input signal on the touch display screen is determined, determines the first half-bridge circuit and the second half-bridge circuit based on the touch location, and calculates the pressure value of the touch input signal based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

With reference to the fourth aspect, or the first or the second possible implementation of the fourth aspect, in a fourth possible implementation of the fourth aspect, the electronic device further includes:

a differential amplifier, where two input terminals of the differential amplifier are connected to an output terminal of the first half-bridge circuit and an output terminal of the second half-bridge circuit in a one-to-one manner; and the processing circuit component is specifically configured to obtain the output signal of the target full-bridge circuit based on an output signal of the differential amplifier.

With reference to the fourth aspect, or the first or the second possible implementation of the fourth aspect, in a fourth possible implementation of the fourth aspect, the electronic device further includes:

a differential amplifier, where two input terminals of the differential amplifier are connected to an output terminal of the first half-bridge circuit and an output terminal of the second half-bridge circuit in a one-to-one manner;

a filter circuit, where an input terminal of the filter circuit is connected to an output terminal of the differential amplifier; and an AD conversion circuit, where an input terminal of the AD conversion circuit is connected to an output terminal of the filter circuit; and the processing circuit component is specifically configured to obtain the output signal of the target full-bridge circuit based on an output signal of the AD conversion circuit.

A fifth aspect provides a method for performing pressure-sensitive detection on a touch display screen, where a pressure sensor array is distributed in the touch display screen, the pressure sensor array is the pressure sensor array included in the pressure-sensitive detection apparatus provided in the first aspect, and the method includes:

determining a touch location of a touch input signal on the touch display screen;

determining, based on the touch location, a first half-bridge circuit and a second half-bridge circuit in the pressure sensor array that are corresponding to the touch location, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit; and obtaining an output signal of a target full-bridge circuit, where the target full-bridge circuit indicates a full-bridge circuit including the first half-bridge circuit and the second half-bridge circuit; and calculating a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

Specifically, differential amplification may be performed on an output signal of the first half-bridge circuit and an output of the second half-bridge circuit by using a differential amplifier, to obtain the output signal of the target full-bridge circuit.

In the method that is for performing pressure-sensitive detection on a touch display screen and that is provided in this embodiment of the present invention, the first half-bridge circuit and the second half-bridge circuit in the pressure sensor array that are corresponding to the touch location are determined based on the touch location of the touch input signal on the touch display screen. Neither a deformation amount difference of the first half-bridge circuit nor a deformation amount difference of the second half-bridge circuit is 0, and a difference between the output signal of the first half-bridge circuit and the output signal of the second half-bridge circuit is not 0, either. Therefore, the target full-bridge circuit including the first half-bridge circuit and the second half-bridge circuit can amplify a pressure-sensitive signal of the touch input signal. The pressure value of the touch input signal is calculated based on the output signal of the target full-bridge circuit, so that pressure-sensitive detection precision and sensitivity can be improved.

With reference to the fifth aspect, in a first possible implementation of the fifth aspect, the determining, based on the touch location, a first half-bridge circuit that is corresponding to the touch location in the pressure sensor array includes:

determining, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

With reference to the first possible implementation of the fifth aspect, in a second possible implementation of the fifth aspect, the determining, based on the touch location, a second half-bridge circuit that is corresponding to the touch location in the pressure sensor array includes:

determining, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

With reference to the fifth aspect, or the first or the second possible implementation of the fifth aspect, in a third possible implementation of the fifth aspect, the method further includes:

determining a sampled touch location on the display screen, receiving a sampled touch input signal that has a known pressure value and that is input at the sampled touch location, selecting, from the pressure sensor array, a sampled full-bridge circuit of the sampled touch location, and establishing the pressure calculation model based on the sampled touch location, the pressure value of the sampled touch input signal, and an output signal of the sampled full-bridge circuit.

Therefore, in the technical solution provided in this embodiment of the present invention, the pressure calculation model is pre-established. When the touch location of the touch input signal on the touch display screen is determined, the first half-bridge circuit and the second half-bridge circuit are determined based on the touch location, and the pressure value of the touch input signal is calculated based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

A sixth aspect provides a pressure-sensitive detection apparatus, and the pressure-sensitive detection apparatus is configured to perform the method according to the fifth aspect or any possible implementation of the fifth aspect. The pressure-sensitive detection apparatus may include modules configured to perform the method according to the fifth aspect or any possible implementation of the fifth aspect.

In the foregoing implementations, the pressure calculation model may be a mathematical function formula, or may be a database. Data elements in the database include a pressure value of a touch input signal, a touch location of the touch input signal, and an output value of a full-bridge circuit or a half-bridge circuit that is based on the pressure sensor array.

In the foregoing implementations, the output signal of the target full-bridge circuit is a voltage signal.

Based on the foregoing technical solutions, in the embodiments of the present invention, when there is the touch input signal on the touch display screen, the first half-bridge circuit and the second half-bridge circuit in the pressure sensor array that are corresponding to the touch location of the touch input signal output the signals. Neither the deformation amount difference of the first half-bridge circuit nor the deformation amount difference of the second half-bridge circuit is 0, and the difference between the output signal of the first half-bridge circuit and the output signal of the second half-bridge circuit is not 0, either. Therefore, the full-bridge circuit including the first half-bridge circuit and the second half-bridge circuit can amplify the pressure-sensitive signal of the touch input signal. Therefore, the pressure-sensitive detection apparatus provided in the present invention can effectively improve sensitivity and precision of pressure-sensitive detection on the touchscreen.

BRIEF DESCRIPTION OF DRAWINGS

FIG. 18 is a schematic flowchart of a method for performing pressure-sensitive detection on a touch display screen according to an embodiment of the present invention; and FIG. 19 is still another schematic diagram of a pressure-sensitive detection apparatus according to an embodiment of the present invention.

DESCRIPTION OF EMBODIMENTS

The following describes the technical solutions in the embodiments of the present invention with reference to the accompanying drawings.

The embodiments of the present invention are applied to an electronic device that uses touchscreen input, such as a smartphone, a watch, a notebook computer, or a television.

Figure 1:
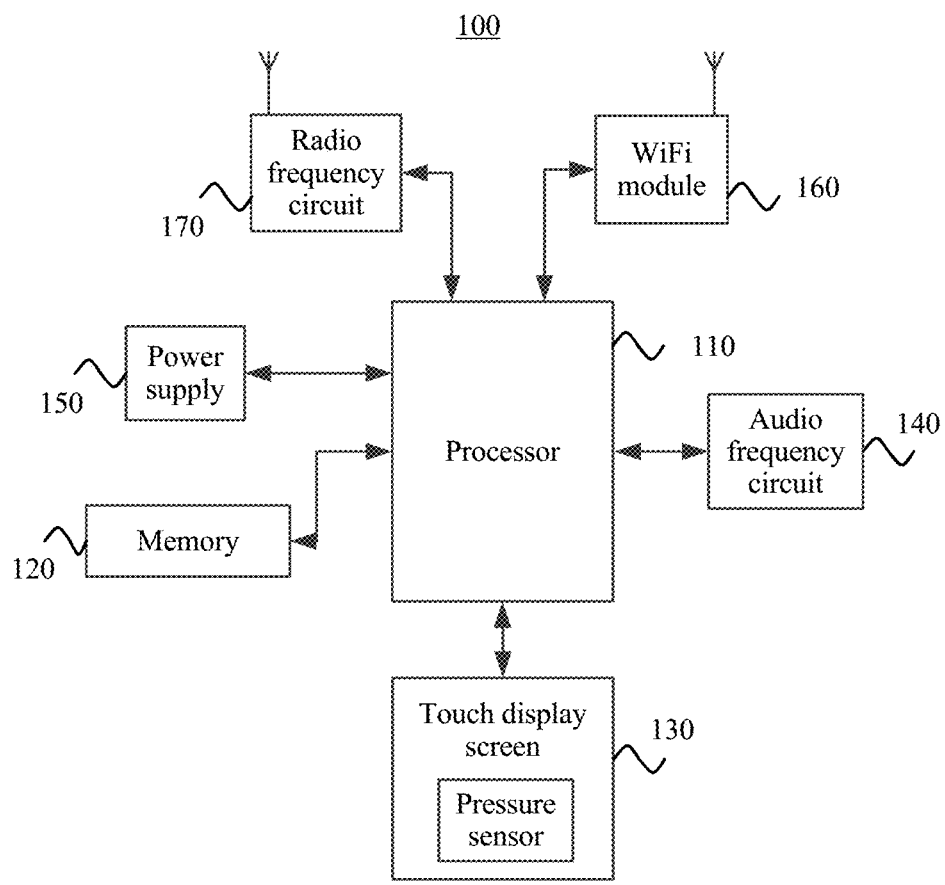
FIG. 1 is a schematic diagram of an application scenario according to an embodiment of the present invention.

FIG. 1 is a schematic structural diagram of an electronic device (for example, a touchscreen mobile phone) 100 to which an embodiment of the present invention is applied. The electronic device 100 includes a processor 110, a memory 120, and a touch display screen 130. Touch display screen 130 includes a pressure sensor 131, and the pressure sensor 131 is configured to sense a pressure value of a touch input signal on the touch display screen 130. The processor 110 is configured to receive a pressure signal sensed by the pressure sensor 131, and is configured to process the pressure signal, for example, trigger an application program in the electronic device 100 based on the pressure signal.

It should be understood that, the electronic device may further include other components, such as an audio frequency circuit 140, a power supply 150, a WiFi module 160, and a radio frequency circuit 170 that are shown in FIG. 1.

Figure 2:
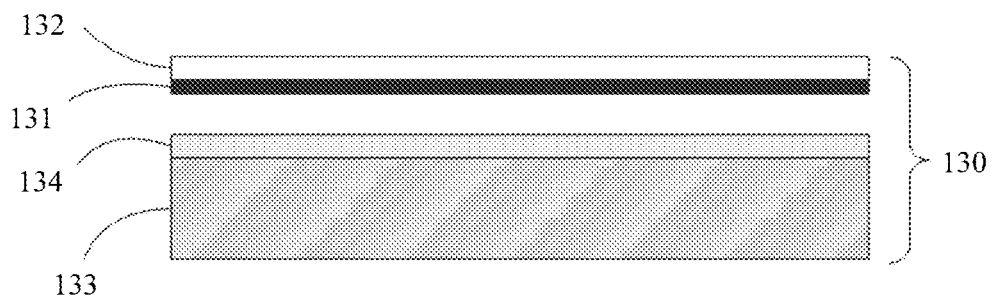
FIG. 2 and FIG. 3 are cross sectional schematic views of a touch display screen according to an embodiment of the present invention.

FIG. 2 is a cross sectional schematic view of the touch display screen 130. The touch display screen 130 includes a display screen coverage layer 132, a display screen display module 133, a touch input pad 134, and a pressure sensor 131.

The touch input pad 134 is located between the display screen coverage layer 132 and the display screen display module 133. The touch input pad 134 may be independent of the display screen coverage layer 132, or may be included in the display screen coverage layer 132. The display screen coverage layer 132 may be made of various glass, plastics, or other transparent materials. A current mainstream display screen coverage layer is cover glass.

Figure 3:
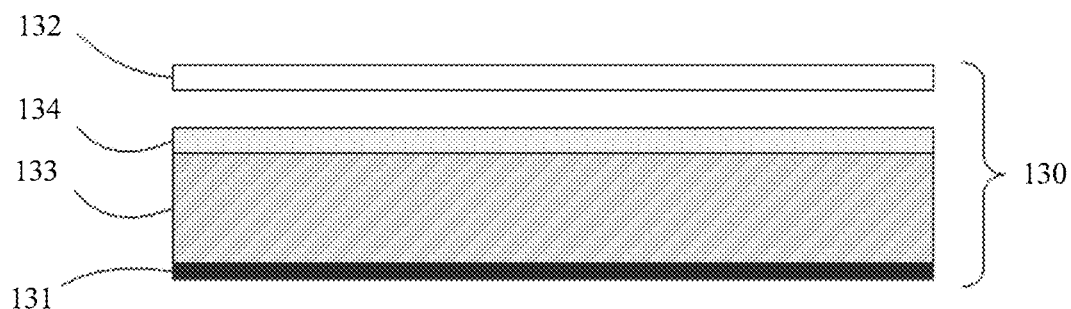

The pressure sensor 131 is installed in a support structure inside the touch display screen 130. Specifically, as shown in FIG. 2, the pressure sensor 131 may be installed on a surface (namely, a side that can be seen by a user in use), of the display screen coverage layer 132, facing the display screen display module 133. Further, as shown in FIG. 3, the pressure sensor 131 may alternatively be installed on an underside (namely, a side opposite to a surface) of the display screen display module 133.

In actual application, because a single pressure sensor is usually relatively small, to sense pressure from each location on the touch display screen as precisely as possible, a plurality of pressure sensors usually need to be placed in an array form. The plurality of pressure sensors constitute a pressure sensor array (for example, a pressure sensor array 3000 shown in FIG. 6).

The pressure sensor in the embodiments of the present invention is a strain-type sensor. The strain-type sensor is a type of sensor that is based on strain generated when a measurement sensing element is deformed due to a force. A resistance strain slice is a sensing element that is most commonly used by the strain-type sensor, and the resistance strain slice is a sensing element that can convert a change of strain on a mechanical component into a resistance change. A strain-type sensor that uses a resistance strain slice as a sensing element is referred to as a piezoresistive sensor. In addition, there are other strain-type sensors, including a piezoelectric sensor, a capacitive sensor, an electromagnetic sensor, an optical sensor, an acoustic sensor, and the like. The pressure sensor in the embodiments of the present invention includes but is not limited to the foregoing various strain-type sensors.

For ease of understanding and description, an example in which the pressure sensor is the piezoresistive sensor is used below to describe the solutions in the embodiments of the present invention.

It should be understood that, when an external object (for example, a user finger or a sensing stylus) applies, through the display screen coverage layer 132, pressure to the touch display screen 130 shown in FIG. 2 or FIG. 3, because of force transfer, the pressure sensor 131 is also deformed to some degree, and then generates a strain signal.

Figure 4:
FIG. 4 and FIG. 5 are schematic diagrams of a working principle of a pressure sensor.
Figure 5:
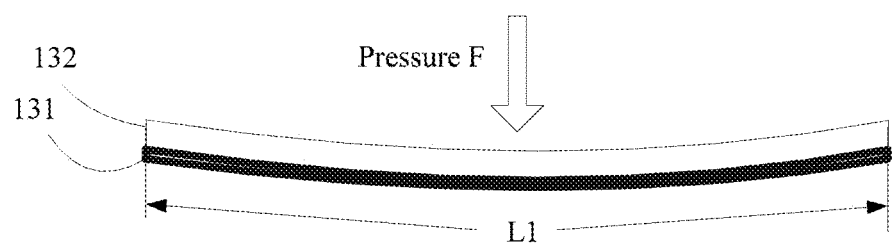

FIG. 4 and FIG. 5 are schematic diagrams of a working principle of the pressure sensor 131. A scenario in which the pressure sensor 131 is located at the display screen coverage layer 132 shown in FIG. 2 is used as an example. As shown in FIG. 4, the display screen coverage layer 132 is not deformed when no pressure is applied to the display screen coverage layer 132. In this case, the pressure sensor 131 is also in an initial state and has a length of L0. An initial resistance of the pressure sensor 131 is R0. As shown in FIG. 5, the display screen coverage layer 132 is deformed because an external force F is applied to the display screen coverage layer 132. In this case, the pressure sensor 131 is also correspondingly deformed, the length is increased to L1, and the resistance is increased to R1. A resistance variation value is $\Delta R = R1 - R0$. It should be understood that, as the pressure F is increased, the pressure sensor 131 is deformed to a larger degree, namely, the length of the pressure sensor 131 is increased to a larger degree, and the resistance variation value $\Delta R$ is larger.

It should be understood that, there is a mathematical relationship between the pressure F and the resistance variation value of the pressure sensor 131 shown in FIG. 5. Therefore, a value of the pressure F applied to the touch display screen can be obtained through inverse extrapolation provided that the resistance variation value $\Delta R$ of the pressure sensor is obtained. In the prior art, a resistance variation value of a pressure sensor is usually converted into an electrical signal (a current signal or a voltage signal) by using a conversion circuit, and the electrical signal is output to a processing circuit (for example, a CPU). Then, the processing circuit obtains, through inverse extrapolation based on the output electrical signal, a value of pressure applied to a touch display screen. In actual application, extremely small pressure is actually applied to a touch display screen, and correspondingly, a pressure sensor is deformed to an extremely small degree, a resistance variation value is extremely small, and an output electrical signal is also extremely small and therefore is likely to be drowned by a noise signal. This causes relatively low pressure measurement sensitivity and resolution. In an existing solution, an amplification function structure is designed by applying a structural mechanics principle, and an output electrical signal is amplified by using the amplification function structure, so as to improve a signal-to-noise ratio. However, a display screen is likely to be thickened in this manner, and this manner is likely to be affected by a structural processing error and consequently subsequent calibration is relatively troublesome.

Embodiment 1

To resolve the foregoing technical problem, the embodiments of the present invention provide a pressure-sensitive detection apparatus, a touch display screen, and an electronic device, so as to effectively improve pressure-sensitive detection sensitivity and precision.

Figure 6:
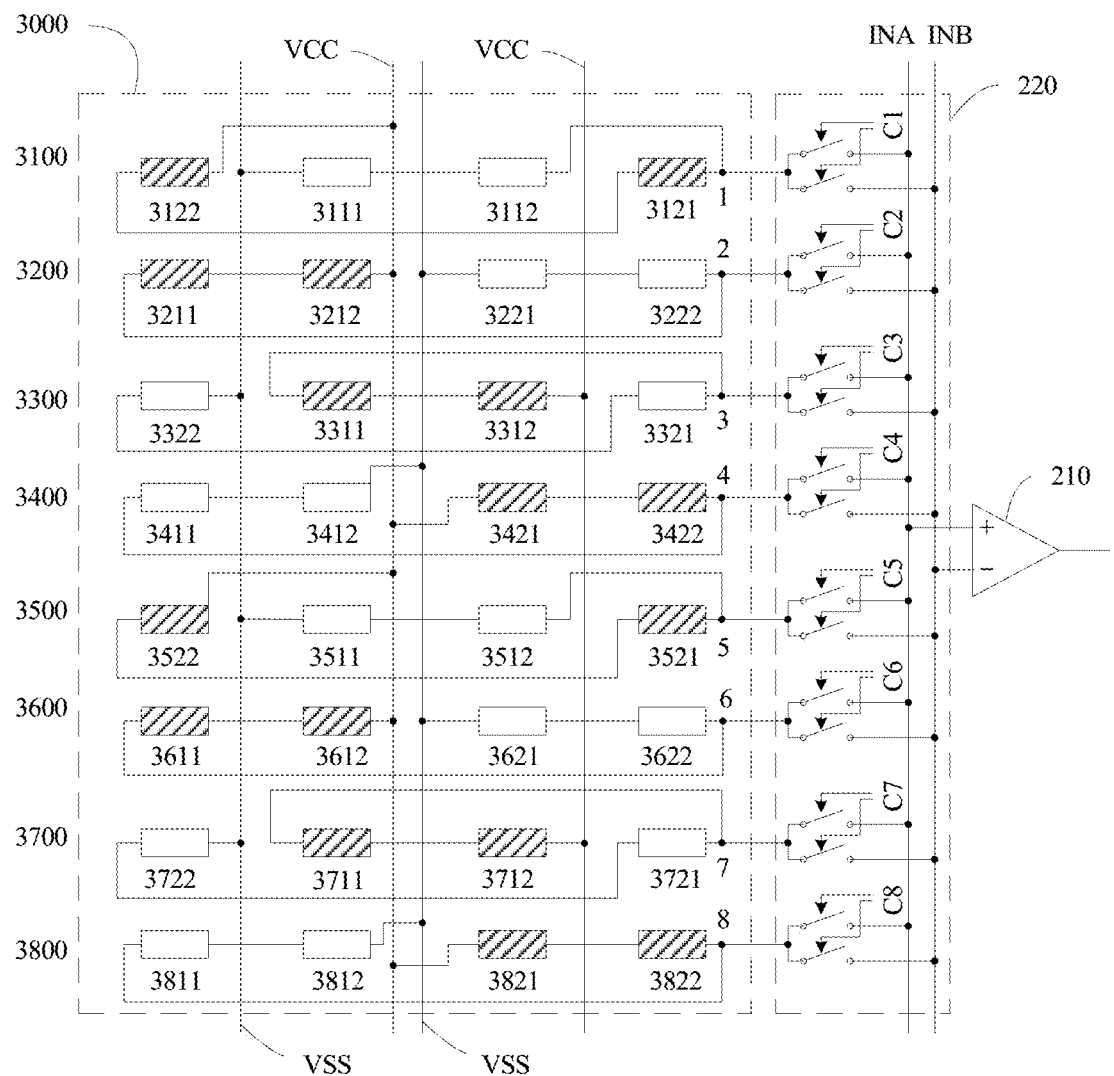
FIG. 6 is a schematic diagram of a pressure-sensitive detection apparatus according to an embodiment of the present invention.

FIG. 6 is a schematic diagram of a pressure-sensitive detection apparatus 200 according to this embodiment of the present invention. The pressure-sensitive detection apparatus 200 includes a pressure sensor array 3000 and a differential amplifier 210.

The pressure sensor array 3000 is located in a touch display screen, and pressure of a touch input signal on the touch display screen is transferred to the pressure sensor array 3000.

Specifically, the touch input signal is a signal generated when an external object (for example, a user finger or a sensing stylus) touches the touch display screen. The touch input signal includes a pressure signal, namely, a signal in a Z direction of the touch display screen. A pressure value of the touch input signal is a value of pressure applied by the touch input signal in the Z direction of the display screen. It should be understood that, a touch location of the touch input signal on the display screen is XY location information, on the display screen, of a point at which the external object touches the display screen.

The X direction and Y direction mentioned above are respectively a length direction and a width direction (or a width direction and a length direction) that exist when the display screen considered as an equivalent cuboid is normally placed, and the Z direction is a height (or thickness) direction.

It should be understood that the pressure sensor array 3000 is provided within the touch display screen. In other words, the pressure sensor array 3000 is installed in a support structure inside the touch display screen. For example, the pressure sensor array 3000 is installed inside the touch display screen 130 shown in FIG. 2. Specifically, each pressure sensor in the pressure sensor array 3000 may be installed at the display screen coverage layer 132 in a same manner as the pressure sensor 131 shown in FIG. 2 or FIG. 3.

Each row of the pressure sensor array 3000 includes M (M is equal to 4 in FIG. 6) pressure sensors, and the M pressure sensors constitute one half-bridge circuit. The half-bridge circuit includes a first pressure sensor unit and a second pressure sensor unit. A first terminal of the first pressure sensor unit is connected to a power supply (for example, VCC in FIG. 6), a second terminal of the first pressure sensor unit is connected to a first terminal of the second pressure sensor unit, and a second terminal of the second pressure sensor unit is connected to the ground (for example, VSS in FIG. 6). The second terminal of the first pressure sensor unit is an output terminal of the half-bridge circuit. The first pressure sensor unit and the second pressure sensor unit each include one or more pressure sensors.

As shown in FIG. 6, the pressure sensor array 3000 may include eight rows, each row includes four pressure sensors, and the four pressure sensors in each row are connected to the power supply VCC and the ground VSS, to constitute a half-bridge circuit.

Specifically, pressure sensors 3122, 3111, 3112, and 3121 in a first row constitute a half-bridge circuit 3100. A circuit connection structure of the half-bridge circuit 3100 is as follows: One terminal of the pressure sensor 3122 is connected to the power supply VCC, the other terminal of the pressure sensor 3122 is connected to one terminal of the pressure sensor 3121, the other terminal of the pressure sensor 3121 is connected to one terminal of the pressure sensor 3112, the other terminal of the pressure sensor 3112 is connected to one terminal of the pressure sensor 3111, and the other terminal of the pressure sensor 3111 is connected to the ground VSS. The pressure sensors 3122 and 3121 constitute a first pressure sensor unit 3120 in the half-bridge circuit 3100, and the pressure sensors 3111 and 3112 constitute a second pressure sensor unit 3110 in the half-bridge circuit 3100. An output terminal of the half-bridge circuit 3100 is a terminal through which the first pressure sensor unit 3120 is connected to the second pressure sensor unit 3110, namely, a terminal through which the pressure sensor 3121 is connected to the pressure sensor 3112, namely, a port 1 shown in FIG. 6. Half-bridge circuits in remaining rows of the pressure sensor array 3000 have a similar connection manner to the half-bridge circuit 3100 in the first row, and details are not described.

By way of example, and not limitation, as shown in FIG. 6, the pressure sensor array 3000 has the eight rows. In actual application, a quantity of rows of the pressure sensor array may be determined based on a size of the touch display screen or a related requirement. As shown in FIG. 6, both rows and columns of the pressure sensor array 3000 are evenly spaced. In actual application, an inter-row spacing and an inter-column spacing in the pressure sensor array 3000 may be adaptively adjusted based on different precision requirements, and the rows and columns are not strictly limited to being absolutely arranged neatly. It should be understood that, in the pressure sensor array 3000, both a spacing between adjacent pressure sensors in each row and a spacing between adjacent pressure sensors in each column may be determined based on a screen size and a quantity of pressure sensors included in the pressure sensor array 3000.

For ease of description and understanding, in the following, a half-bridge circuit constituted in the first low of the sensor array 3000 is denoted as the half-bridge circuit 3100, and a half-bridge circuit constituted in a second row is denoted as a half-bridge circuit 3200. By analogy, half-bridge circuits constituted in a third row to an eighth row are respectively denoted as half-bridge circuits 3300 to 3800.

It should be understood that, in the half-bridge circuit 3200, pressure sensors 3211 and 3212 constitute a first pressure sensor unit 3210, pressure sensors 3221 and 3222 constitute a second pressure sensor unit 3220, and an output terminal of the half-bridge circuit 3200 is a port 2 shown in FIG. 6. In the half-bridge circuit 3300, pressure sensors 3311 and 3312 constitute a first pressure sensor unit 3310, pressure sensors 3321 and 3322 constitute a second pressure sensor unit 3320, and an output terminal of the half-bridge circuit 3300 is a port 3 shown in FIG. 6. In the half-bridge circuit 3400, pressure sensors 3421 and 3422 constitute a first pressure sensor unit 3420, pressure sensors 3411 and 3412 constitute a second pressure sensor unit 3410, and an output terminal of the half-bridge circuit 3400 is a port 4 shown in FIG. 6. In the half-bridge circuit 3500, pressure sensors 3521 and 3522 constitute a first pressure sensor unit 3520, pressure sensors 3511 and 3512 constitute a second pressure sensor unit 3510, and an output terminal of the half-bridge circuit 3500 is a port 5 shown in FIG. 6. In the half-bridge circuit 3600, pressure sensors 3611 and 3612 constitute a first pressure sensor unit 3610, pressure sensors 3621 and 3622 constitute a second pressure sensor unit 3620, and an output terminal of the half-bridge circuit 3600 is a port 6 shown in FIG. 6. In the half-bridge circuit 3700, pressure sensors 3711 and 3712 constitute a first pressure sensor unit 3710, pressure sensors 3721 and 3722 constitute a second pressure sensor unit 3720, and an output terminal of the half-bridge circuit 3700 is a port 7 shown in FIG. 6. In the half-bridge circuit 3800, pressure sensors 3821 and 3822 constitute a first pressure sensor unit 3820, pressure sensors 3811 and 3812 constitute a second pressure sensor unit 3810, and an output terminal of the half-bridge circuit 3800 is a port 8 shown in FIG. 6.

It should be understood that, any two half-bridge circuits in the pressure sensor array 3000 can constitute one full-bridge circuit.

When there is a touch input signal on the touch display screen, a first half-bridge circuit and a second half-bridge circuit in the pressure sensor array 3000 that are corresponding to a touch location of the touch input signal output signals. A deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit.

Figure 7:
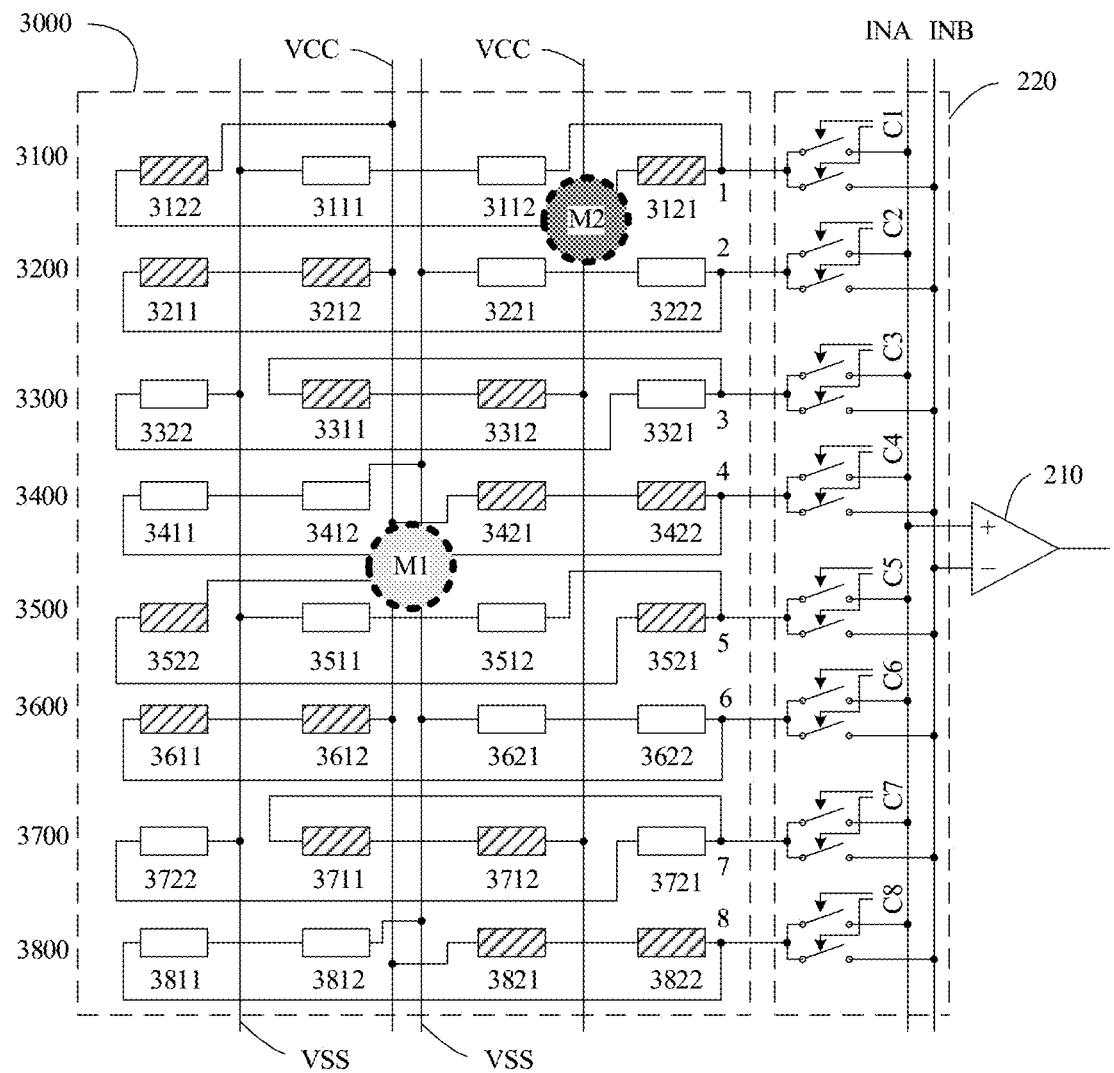
FIG. 7 is a schematic diagram of a touch location of a touch input signal.

Specifically, as shown in FIG. 7, when the touch location of the touch input signal on the touch display screen is M1, the first half-bridge circuit may be the half-bridge circuit 3500, and the second half-bridge circuit may be the half-bridge circuit 3300. With reference to FIG. 6 and FIG. 7, it can be learned that the touch location M1 is near a row in which the half-bridge circuit 3500 is located, and is above the pressure sensors 3511 and 3512. In this case, a degree to which a force is applied to the pressure sensors 3522 and 3521 should be smaller than a degree to which a force is applied to the pressure sensors 3512 and 3511. Therefore, in the half-bridge circuit 3500, a deformation amount of the first pressure sensor unit 3520 (namely, the pressure sensors 3522 and 3521) is less than a deformation amount of the second pressure sensor unit 3510 (namely, the pressure sensors 3511 and 3512). In the half-bridge circuit 3300, a degree to which a force is applied to the pressure sensors 3311 and 3312 should be larger than a degree to which a force is applied to the pressure sensors 3321 and 3322. Therefore, a deformation amount of the first pressure sensor unit 3310 (namely, the pressure sensors 3311 and 3312) is greater than a deformation amount of the second pressure sensor unit 3320 namely, the pressure sensors 3321 and 3322).

Figure 8:
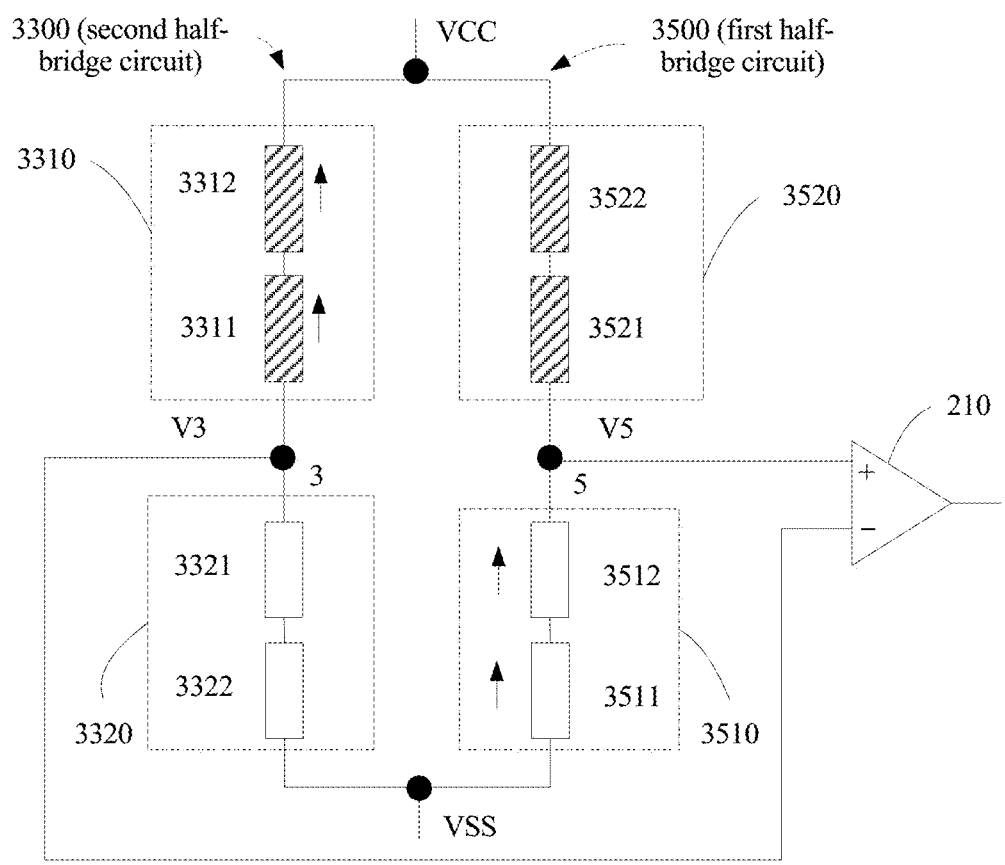
FIG. 8 is a schematic circuit diagram of a first half-bridge circuit and a second half-bridge circuit that are corresponding to a touch location M1 shown in FIG. 7.

FIG. 8 is a schematic circuit diagram of the first half-bridge circuit (namely, the half-bridge circuit 3500) and the second half-bridge circuit (namely, the half-bridge circuit 3300) that are corresponding to the touch location M1 shown in FIG. 7. After a force is applied to the half-bridge circuit 3500, because the deformation amount of the first pressure sensor unit 3520 is less than the deformation amount of the second pressure sensor unit 3510, a resistance value of the first pressure sensor unit 3520 is less than a resistance value of the second pressure sensor unit 3510. According to a circuit voltage division principle, it can be learned that a signal V5 that is output by the half-bridge circuit 3500 when a force is applied to the half-bridge circuit 3500 is greater than a signal V0 that is output by the half-bridge circuit 3500 when no force is applied to the half-bridge circuit 3500, namely, V5=V0+ΔV1 (ΔV1>0). Likewise, based on a relationship between the force-based deformation amounts of the first pressure sensor unit 3310 and the second pressure sensor unit 3320 in the half-bridge circuit 3300, it can be learned that a resistance value of the first pressure sensor unit 3310 is greater than a resistance value of the second pressure sensor unit 3320. According to the circuit voltage division principle, it can be learned that an output signal V3 of the half-bridge circuit 3300 is less than a signal V0 that is output by the half-bridge circuit 3300 when no force is applied to the half-bridge circuit 3300, namely, V3=V0−ΔV2 (ΔV2>0).

It should be noted that when no force is applied, output signals of all half-bridge circuits in the pressure sensor array 3000 are equal and all assumed to be V0 in this specification.

The output signal V5 of the half-bridge circuit 3500 is not equal to the output signal V3 of the half-bridge circuit 3300, and a difference between the two output signals is V5−V3=ΔV1+ΔV2. It should be understood that, there is a mathematical relationship between a pressure value of the touch input signal that is at the touch location M1 and the output signal variation value ΔV1 of the half-bridge circuit 3500, and there is also a mathematical relationship between the pressure value of the touch input signal that is at the touch location M1 and the output signal variation value ΔV2 of the half-bridge circuit 3300. Therefore, there is also a mathematical relationship between the pressure value of the touch input signal that is at the touch location M1 and the difference (V5−V3=ΔV1+ΔV2) between the output signals of the half-bridge circuits 3300 and 3500. In other words, there is a mathematical relationship between the pressure value of the touch input signal that is at the touch location M1 and an output signal (V5−V3=ΔV1+ΔV2) of a full-bridge circuit (denoted as a target full-bridge circuit in this specification) including the half-bridge circuits 3300 and 3500.

It should be understood that, the output signal of the target full-bridge circuit including the half-bridge circuits 3300 and 3500 reflects a superposition effect of pressure strain effects of the touch input signal on the half-bridge circuit 3300 and the half-bridge circuit 3500, so that a pressure signal of the touch input signal on the touch display screen can be better sensed.

As shown in FIG. 8, this embodiment further includes the differential amplifier 210, the output terminals V5 and V3 of the two half-bridge circuits are respectively input to two input terminals of the differential amplifier 210. Specifically, the output terminal 5 of the half-bridge circuit 3500 is connected to one input terminal of the differential amplifier 210, and the output terminal 3 of the half-bridge circuit 3300 is connected to the other input terminal of the differential amplifier 210.

It should be understood that, differential amplification processing is performed on the output signal V3 of the half-bridge circuit 3300 and the output signal V5 of the half-bridge circuit 3500 by using the differential amplifier 210. Therefore, a pressure-sensitive signal of the touch input signal is further amplified, so that pressure-sensitive detection precision and sensitivity can be improved. Therefore, the pressure-sensitive detection apparatus provided in this embodiment of the present invention can effectively improve sensitivity and precision of pressure-sensitive detection on the touchscreen.

In this embodiment of the present invention, when there is the touch input signal on the touch display screen, the first half-bridge circuit and the second half-bridge circuit in the pressure sensor array 3000 that are corresponding to the touch location of the touch input signal output the signals. Specifically, the first half-bridge circuit and the second half-bridge circuit are selected based on degrees to which forces are applied to pressure sensors in the pressure sensor array, and the degrees to which the forces are applied to the pressure sensors in the pressure sensor array are closely related to the touch location of the touch input signal.

Embodiment 2

Based on the foregoing embodiment, in this embodiment, the first half-bridge circuit has a largest deformation amount difference in the pressure sensor array 3000. The deformation amount difference indicates a difference between a deformation amount of the first pressure sensor unit and a deformation amount of the second pressure sensor unit in a same half-bridge circuit.

It should be understood that, the first half-bridge circuit has the largest deformation amount difference in the pressure sensor array 3000, and this indicates that a row in which the first half-bridge circuit is located is a row closest to the touch location in the pressure sensor array 3000.

For example, in the example described with reference to FIG. 7, when the touch location is M1, the half-bridge circuit 3500 in the row closest to M1 is selected as the first half-bridge circuit.

Figure 9:
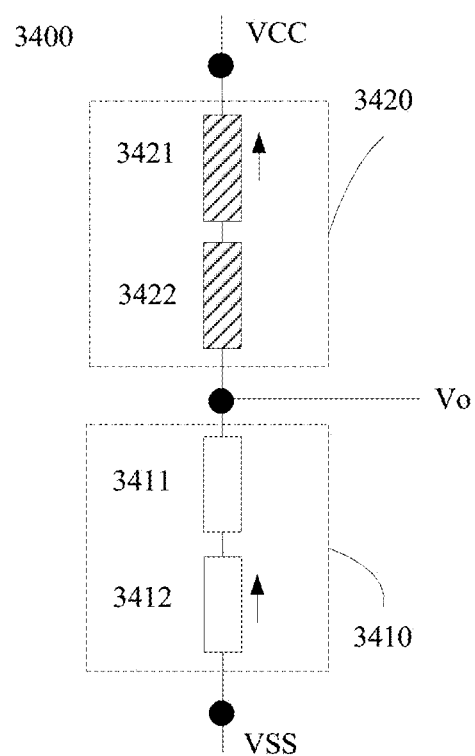
FIG. 9 is a schematic circuit diagram of a half-bridge circuit 3400 in a case of a touch location M1 shown in FIG. 7.

Although the half-bridge circuit 3400 is also extremely close to M1, the half-bridge circuit 3400 is not selected as the first half-bridge circuit. The reason is as follows:

As shown in FIG. 7 and FIG. 9, in a case of the touch location M1 shown in FIG. 7, in the half-bridge circuit 3400, a degree to which a force is applied to the pressure sensors 3421 and 3412 is greater than a degree to which a force is applied to the pressure sensors 3422 and 3411. Therefore, a deformation amount of the first pressure sensor unit 3420 (the pressure sensors 3421 and 3422) may be slightly different from, or even may be equal to, a deformation amount of the second pressure sensor unit 3410 (the pressure sensors 3411 and 3412). A resistance value of the first pressure sensor unit 3420 may also be similar or equal to a resistance value of the second pressure sensor unit 3410. According to the circuit voltage division principle, it can be learned that a signal that is output by the half-bridge circuit 3400 in this case may be extremely similar, or even equal, to a signal V0 that is output by the half-bridge circuit 3400 when no force is applied to the half-bridge circuit 3400, and consequently the pressure-sensitive signal of the touch input signal cannot be expressed. Therefore, in the case of the touch location M1 shown in FIG. 7, the half-bridge circuit 3400 is selected as the first half-bridge circuit as little as possible.

It should be understood that, in this embodiment of the present invention, the half-bridge circuit 3300 or 3700 may be selected as the second half-bridge circuit.

Therefore, in this embodiment of the present invention, the first half-bridge circuit has the largest deformation amount difference in the pressure sensor array, and therefore there is a relatively large difference between the output signal of the first half-bridge circuit and the output signal of the second half-bridge circuit, so that the pressure-sensitive signal of the touch input signal on the touch display screen can be more effectively amplified, and pressure-sensitive detection precision and sensitivity can be further improved.

Embodiment 3

Based on the foregoing embodiments, in this embodiment, the second half-bridge circuit has a largest deformation amount difference among half-bridge circuits other than the first half-bridge circuit in the pressure sensor array.

A working principle of the full-bridge circuit described in Embodiment 1 is to maximize both ΔV1 and ΔV2 that are generated in the full-bridge circuit including the first half-bridge circuit and the second half-bridge circuit. In Embodiment 2, ΔV1 is maximized, and in this embodiment, ΔV2 is set as large as possible. For example, ΔV2 is the largest other than ΔV1.

During specific selection of a half-bridge circuit, a half-bridge circuit in a row that is relatively close to a touch location is usually selected as the second half-bridge circuit (usually a half-bridge circuit has a larger deformation amount if the half-bridge circuit is closer to a touch location). However, it should be noted that, because pressure sensors in a half-bridge circuit are differently arranged, sometimes a half-bridge circuit may be closer to the touch location, but the circuit closer to the touch location is still inappropriate to be used as the second half-bridge circuit due to a small deformation amount difference generated between two sensor units in the half-bridge circuit.

For example, in the example described with reference to FIG. 7, when the touch location is M1, the half-bridge circuit 3500 in the row closest to M1 is selected as the first half-bridge circuit, and then the half-bridge circuit 3300 relatively close to M1 is selected as the second half-bridge circuit. In this case, although the half-bridge circuit 3400 is closer to M1 than the half-bridge circuit 3300, in the half-bridge circuit 3400, the deformation amount of the first pressure sensor unit 3420 (the pressure sensors 3421 and 3422) may be slightly different from, or even may be equal to, the deformation amount of the second pressure sensor unit 3410 (the pressure sensors 3411 and 3412). Therefore, the half-bridge circuit 3400 is not selected as the second half-bridge circuit.

In this embodiment of the present invention, the first half-bridge circuit has the largest deformation amount difference in the pressure sensor array, and the second half-bridge circuit has the second largest deformation amount difference in the pressure sensor array. Therefore, the difference between the output signal of the first half-bridge circuit and the output signal of the second half-bridge circuit is greater than a difference between output signals of any other two half-bridge circuits in the pressure sensor array. In other words, the difference between the output signal of the first half-bridge circuit and the output signal of the second half-bridge circuit amplifies the pressure-sensitive signal of the touch input signal to a maximum degree. Therefore, the pressure-sensitive detection apparatus provided in the present invention can effectively improve pressure-sensitive detection sensitivity and precision.

Embodiment 4

Based on Embodiment 3, to better understand a solution for selecting the first half-bridge circuit and the second half-bridge circuit based on the touch location, a touch location M2 shown in FIG. 7 is used below as an example for description.

As shown in FIG. 7, when the touch location of the touch input signal on the touch display screen is M2, the half-bridge circuit 3200 closest to M2 is selected as the first half-bridge circuit, and the half-bridge circuit 3400 relatively close to M2 is selected as the second half-bridge circuit.

It should be understood that, under pressure at the touch location M2, a deformation amount of the first pressure sensor unit 3210 (corresponding to the pressure sensors 3211 and 3212 that are shown in FIG. 7) is less than a deformation amount of the second pressure sensor unit 3220 (corresponding to the pressure sensors 3221 and 3222 that are shown in FIG. 7) in the half-bridge circuit 3200, and a deformation amount of the first pressure sensor unit 3420 (corresponding to the pressure sensors 3421 and 3422 that are shown in FIG. 7) is greater than a deformation amount of the second pressure sensor unit 3410 (corresponding to the pressure sensors 3411 and 3412 that are shown in FIG. 7) in the half-bridge circuit 3400.

Figure 10:
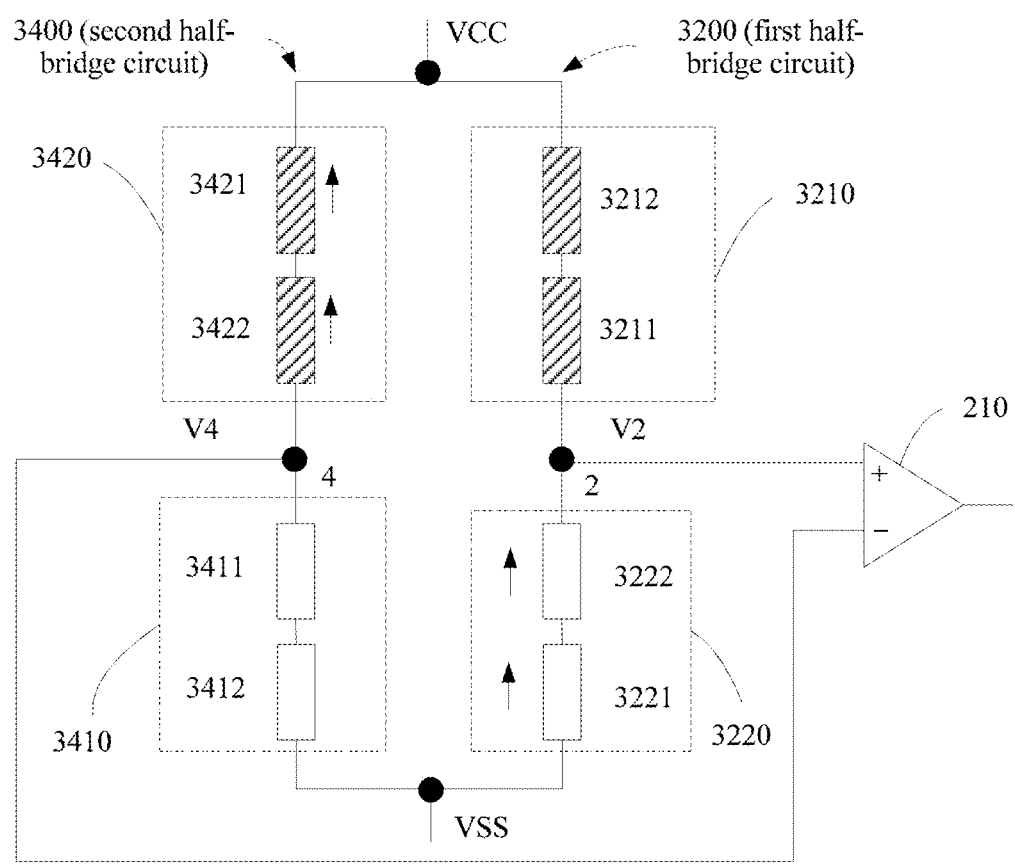
FIG. 10 is a schematic circuit diagram of a first half-bridge circuit and a second half-bridge circuit that are corresponding to a touch location M2 shown in FIG. 7.

FIG. 10 is a schematic diagram of a circuit structure of the half-bridge circuits 3200 and 3400. Based on the foregoing analysis of the deformation amounts of the half-bridge circuits 3200 and 3400, it can be learned that in the half-bridge circuit 3200, a resistance of the first pressure sensor unit 3210 is lower than a resistance of the second pressure sensor unit 3220. Therefore, an output signal V2 of the half-bridge circuit 3200 is greater than a signal V0 that is output by the half-bridge circuit 3200 when no force is applied to the half-bridge circuit 3200, namely, V2=V0+ΔV1 (ΔV1>0). Likewise, in the half-bridge circuit 3400, a resistance value of the first pressure sensor unit 3420 is greater than a resistance value of the second pressure sensor unit 3410. Therefore, an output signal V4 of the half-bridge circuit 3400 is less than a signal V0 that is output by the half-bridge circuit 3400 when no force is applied to the half-bridge circuit 3400, namely, V4=V0−ΔV2 (ΔV2>0). In this case, a difference between the output signals of the half-bridge circuits 3200 and 3400 is V2−V4=ΔV1+ΔV2.

It should be understood that, the reason why the half-bridge circuit 3100 or 3300 is not selected as the first half-bridge circuit or the second half-bridge circuit that is corresponding to the touch location M2 is as follows: For example, in the half-bridge circuit 3100, a deformation amount of the first pressure sensor unit 3120 (namely, the pressure sensors 3122 and 3121) is slightly different from, or even may be equal to, a deformation amount of the second pressure sensor unit 3110 (namely, the pressure sensors 3112 and 3111).

Figure 11:
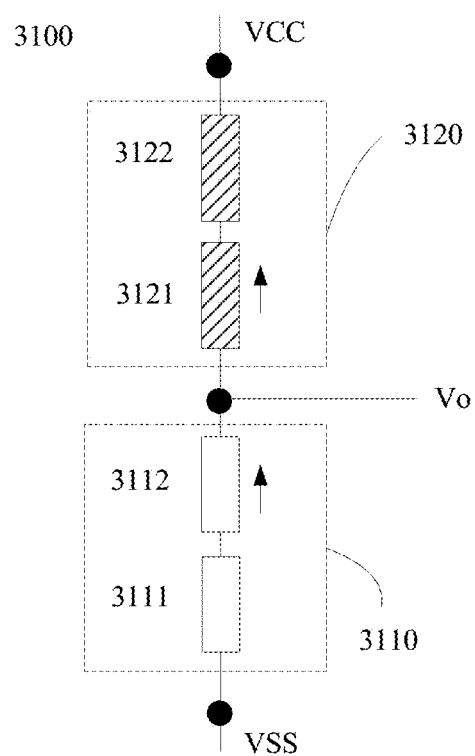
FIG. 11 is a schematic circuit diagram of a half-bridge circuit 3100 in a case of a touch location M2 shown in FIG. 7.

FIG. 11 shows a signal change process of the half-bridge circuit 3100 when the touch location is M2. It can be learned from FIG. 7 that, the pressure sensors 3112 and 3121 are closest to M2, and therefore the pressure sensors 3112 and 3121 each have a larger deformation amount variation than the pressure sensors 3122 and 3111. Corresponding to FIG. 11, upward arrows are marked near both of the two pressure sensors. However, because the two pressure sensors 3112 and 3121 respectively belong to the two different pressure sensor units 3110 and 3120, both the deformation amounts of the two pressure sensor units are increased. In this case, a difference between the deformation amounts of the two units is extremely small, or even is 0, and an output Vo is slightly different from a signal V0 that is output without force appliance. Therefore, the half-bridge circuit 3100 is not more appropriate than the half-bridge circuit 3400. Likewise, the half-bridge circuit 3300 may be in a similar case to the half-bridge circuit 3100. Therefore, the half-bridge circuit 3300 is not selected as the first half-bridge circuit or the second half-bridge circuit when the touch location is M2, either.

Similar to the foregoing embodiments, as shown in FIG. 10, in this embodiment, the output terminal 2 of the half-bridge circuit 3200 is also connected to one input terminal of the differential amplifier 210, and the output terminal 4 of the half-bridge circuit 3400 is connected to the other input terminal of the differential amplifier 210. Differential amplification processing is performed on the output signal V2 of the half-bridge circuit 3200 and the output signal V4 of the half-bridge circuit 3400 by using the differential amplifier 210. Therefore, the pressure-sensitive signal of the touch input signal is further amplified, so that pressure-sensitive detection precision and sensitivity can be improved.

Embodiment 5

Based on the foregoing embodiments, an arrangement location of each sensor is specifically described in this embodiment. As shown in FIG. 6, in a half-bridge circuit in an $i^{th}$ row of the pressure sensor array 3000, the first pressure sensor unit and the second pressure sensor unit are respectively located in the middle and on both sides of the $i^{th}$ row; and in a half-bridge circuit in a $j^{th}$ row of the pressure sensor array 3000, the first pressure sensor unit and the second pressure sensor unit are respectively located on a left side and a right side of the $j^{th}$ row. The $i^{th}$ row and the $j^{th}$ row are any two adjacent rows of the pressure sensor array.

Specifically, in the half-bridge circuit in the $i^{th}$ row of the pressure sensor array, the first pressure sensor unit is located in the middle of the $i^{th}$ row, and the second pressure sensor unit is located on the both sides on edges of the $i^{th}$ row; or the first pressure sensor unit is located on the both sides on edges of the $i^{th}$ row, and the second pressure sensor unit is located in the middle of the $i^{th}$ row. For another example, in the half-bridge circuit in the $j^{th}$ row of the pressure sensor array, the first pressure sensor unit is located on the left side of the $j^{th}$ row, and the second pressure sensor unit is located on the right side of the $j^{th}$ row; or the first pressure sensor unit is located on the right side of the $j^{th}$ row, and the second pressure sensor unit is located on the left side of the $j^{th}$ row.

Specifically, as shown in FIG. 6, in the first, third, fifth, and seventh rows of the pressure sensor array 3000, namely, in the half-bridge circuits 3100, 3300, 3500, and 3700, a first pressure sensor unit and a second pressure sensor unit are respectively located in the middle and on both sides of a row in which the first pressure sensor unit and the second pressure sensor unit are located. In the second, fourth, sixth, and eighth rows of the pressure sensor array 3000, namely, in the half-bridge circuits 3200, 3400, 3600, and 3800, a first pressure sensor unit and a second pressure sensor unit are respectively located on a left edge and a right edge of a row in which the first pressure sensor unit and the second pressure sensor unit are located. For the half-bridge circuits 3100 and 3500, a first pressure sensor unit is located on both sides on edges, and a second pressure sensor unit is located in the middle. For the half-bridge circuits 3300 and 3700, a first pressure sensor unit is located in the middle, and a second pressure sensor unit is located on both sides on edges. For the half-bridge circuits 3200 and 3600, a first pressure sensor unit is located on a left side, and a second pressure sensor unit is located on a right side. For the half-bridge circuits 3400 and 3800, a first pressure sensor unit is located on a right side, and a second pressure sensor unit is located on a left side.

In this embodiment of the present invention, half-bridge circuits in any two adjacent rows of the pressure sensor array are of different structures. A first pressure sensor unit and a second pressure sensor unit in one half-bridge circuit are distributed based on a "middle plus both sides" structure, and a first pressure sensor unit and a second pressure sensor unit in the other half-bridge circuit are distributed based on a "left side plus right side" structure. Therefore, not only a pressure signal from the middle of the touchscreen but also a pressure signal from an edge of the touchscreen can be detected, so that sensitivity and precision of pressure detection on the touchscreen can be effectively improved.

Preferably, the pressure sensor array 3000 has at least four rows. In a half-bridge circuit in an $a^{th}$ row, the first pressure sensor unit is located in the middle of the $a^{th}$ row, and the second pressure sensor unit is located on both sides on edges of the $a^{th}$ row. In a half-bridge circuit in an $(a+2)^{th}$ row, the first pressure sensor unit is located on both sides on edges of the $(a+2)^{th}$ row, and the second pressure sensor unit is located in the middle of the $a^{th}$ row, where a is 1 or 2. In half-bridge circuits in two rows other than the $a^{th}$ row and the $(a+2)^{th}$ row in four rows, the first pressure sensor unit and the second pressure sensor unit are arranged in a "left side plus right side" manner. In one half-bridge circuit, the first pressure sensor unit is located on a left side, and the second pressure sensor unit is located on a right side. In the other half-bridge circuit, the first pressure sensor unit is located on a right side, and the second pressure sensor unit is located on a left side.

It should be understood that, in actual application, a quantity of rows of the pressure sensor array may be determined based on a size of the touch display screen or a related requirement.

It should be noted that, first, the "middle", the "both sides", the "left side", and the "right side" mentioned in this embodiment of the present invention are all described for a row of the pressure sensor array. The "middle" means "close to a midpoint of a row", the "both sides" means "close to both ends of a row", the "left side" means "a left section of a row" (that is not absolutely one half of the row), and the "right side" means "a right section of a row" (that is not absolutely one half of the row). In addition, the "middle", the "both sides", the "left side", and the "right side" are all described based on a specific arrangement manner of the row of the pressure sensor array.

For example, in the pressure sensor array 3000 shown in FIG. 6, each row includes four pressure sensors. In a row, "middle" means locations of two pressure sensors in the middle of the row, "both sides" means locations of two separate pressure sensors on the both sides of the row, "left side" means locations of two pressure sensors on the left side of the row, and "right side" means locations of two pressure sensors on the right side of the row. For example, in the row in which the half-bridge circuit 3500 is located, "middle" means locations of the pressure sensors 3511 and 3512, "both sides" means locations of the pressure sensors 3521 and 3522, "left side" means locations of the pressure sensors 3522 and 3511, and "right side" means locations of the pressure sensors 3512 and 3521.

For another example, if each row of a pressure sensor array includes five pressure sensors, in a row, "middle" means locations of three pressure sensors in the middle of the row, "both sides" means locations of two separate pressure sensors on the both sides of the row, "left side" means locations of three pressure sensors on the left side of the row, and "right side" means locations of two pressure sensors on the right side of the row. Alternatively, "left side" means locations of two pressure sensors on the left side of the row, and "right side" means locations of three pressure sensors on the right side of the row. Cases of other quantities may be determined by analogy with reference to the foregoing principle and examples.

Embodiment 6

Based on the foregoing embodiments, in this implementation, as shown in FIG. 6, the pressure-sensitive detection apparatus 200 further includes:

a switch circuit 220, where the switch circuit includes a plurality of switch components that are in a one-to-one correspondence to a plurality of half-bridge circuits in the pressure sensor array 3000, a first switch component corresponding to the first half-bridge circuit is closed, a second switch component corresponding to the second half-bridge circuit is closed, and all switch components corresponding to remaining half-bridge circuits are open, so that the first half-bridge circuit and the second half-bridge circuit output the signals.

Specifically, the first switch component corresponding to the first half-bridge circuit is closed, so that an output terminal of the first half-bridge circuit is connected to one input terminal of the differential amplifier, and the second switch component corresponding to the second half-bridge circuit is closed, so that an output terminal of the second half-bridge circuit is connected to the other input terminal of the differential amplifier.

Optionally, the switch circuit 220 includes control terminals, and control signals of the control terminals are used to:

control the first switch component and the second switch component to be closed, and control all the switch components corresponding to the remaining half-bridge circuits to be open, so that the output terminal of the first half-bridge circuit is connected to one input terminal of the differential amplifier, and the output terminal of the second half-bridge circuit is connected to the other input terminal of the differential amplifier.

In an example in which the touch location shown in FIG. 7 is M1, the switch circuit 220 controls, by using a control terminal C5, a switch component corresponding to the half-bridge circuit 3500 to be closed, so that the output terminal 5 of the half-bridge circuit 3500 is connected to one input terminal of the differential amplifier 210; the switch circuit 220 controls, by using a control terminal C3, a switch component corresponding to the half-bridge circuit 3300 to be closed, so that the output terminal 3 of the half-bridge circuit 3300 is connected to the other input terminal of the differential amplifier 210. The switch circuit 220 controls all switch components corresponding to half-bridge circuits other than the half-bridge circuits 3300 and 3500 in the pressure sensor array 3000 to be open.

In an example in which the touch location shown in FIG. 7 is M2, the switch circuit 220 controls, by using a control terminal C2, a switch component corresponding to the half-bridge circuit 3200 to be closed, so that the output terminal 2 of the half-bridge circuit 3200 is connected to one input terminal of the differential amplifier 210; the switch circuit 220 controls, by using a control terminal C4, a switch component corresponding to the half-bridge circuit 3400 to be closed, so that the output terminal 4 of the half-bridge circuit 3400 is connected to the other input terminal of the differential amplifier 210. The switch circuit 220 controls all switch components corresponding to half-bridge circuits other than the half-bridge circuits 3200 and 3400 in the pressure sensor array 3000 to be open.

Therefore, in the pressure-sensitive detection apparatus provided in this embodiment of the present invention, output terminals of the half-bridge circuits in the pressure sensor array are connected to the input terminals of the differential amplifier by using the switch components, so that a quantity of cables in an entire circuit can be effectively reduced, thereby reducing circuit costs. In addition, for the determined touch location, only the first half-bridge circuit and the second half-bridge circuit rather than all the half-bridge circuits in the pressure sensor array are activated by using the switch circuit, so that circuit energy consumption can be effectively reduced.

Embodiment 7

Figure 12:
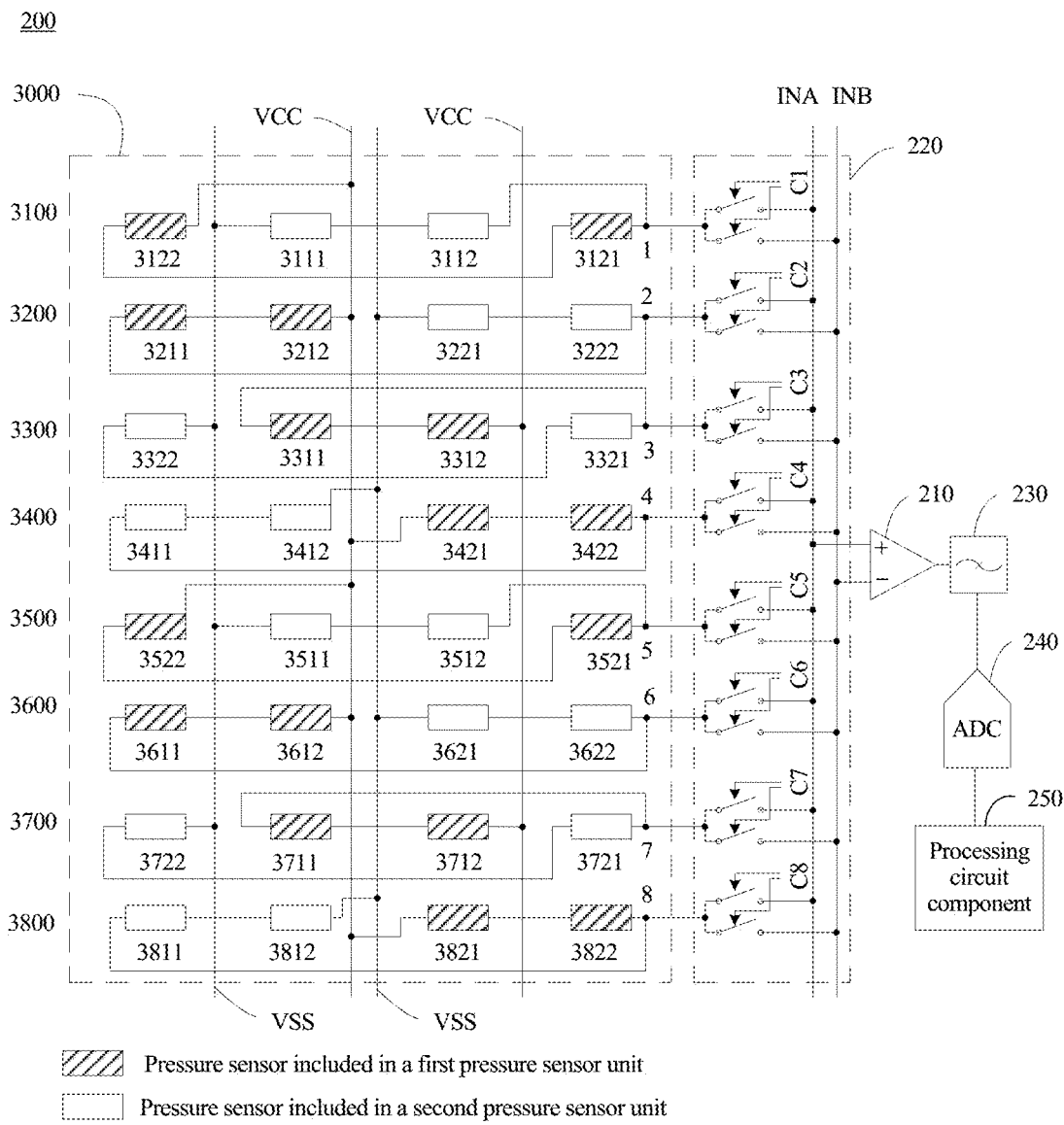
FIG. 12 is another schematic diagram of a pressure-sensitive detection apparatus according to an embodiment of the present invention.

Based on the foregoing embodiments, as shown in FIG. 12, in this implementation, the pressure-sensitive detection apparatus 200 further includes:

a filter circuit 230, where an input terminal of the filter circuit is connected to an output terminal of the differential amplifier, and the filter circuit 230 is configured to perform filtering processing on an output signal of the differential amplifier 210, for example, allow a current at a frequency to pass through or prevent a current at a frequency from passing through;

an analog-to-digital conversion ADC circuit 240, where an input terminal of the ADC circuit is connected to an output terminal of the filter circuit, an output signal of the filter circuit 230 is an analog signal, and the ADC circuit 240 is configured to convert the output signal of the filter circuit 230 into a digital signal; and a processing circuit component 250, configured to: obtain an output signal of a target full-bridge circuit based on an output signal of the ADC circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

Specifically, as shown in Table 1, the pressure calculation model may be in a table form.

TABLE 1

| Sampled touch location | Output signal of a sampled full-bridge circuit | Pressure value of a sampled touch input signal |
|---|---|---|
| M1 | Vout1 | F1 |
| M2 | Vout2 | F2 |
| M3 | Vout3 | F3 |
| ... | ... | ... |

If the touch location is M3, and the output signal of the target full-bridge circuit is Vout3, based on the pressure calculation model shown in Table 1, it can be learned that the pressure value of the touch input signal is F3.

It should be understood that, Table 1 is merely used as an example rather than a limitation. In this embodiment of the present invention, the pressure calculation model may be implemented in other manners. For example, calculation is performed by using a particular function. This is not specifically limited in this embodiment.

In this embodiment of the present invention, when there is the touch input signal on the touch display screen, the first half-bridge circuit and the second half-bridge circuit in the pressure sensor array that are corresponding to the touch location of the touch input signal output the signals. Neither the deformation amount difference of the first half-bridge circuit nor the deformation amount difference of the second half-bridge circuit is 0, and the difference between the output signal of the first half-bridge circuit and the output signal of the second half-bridge circuit is not 0, either. Therefore, the target full-bridge circuit including the first half-bridge circuit and the second half-bridge circuit can amplify the pressure-sensitive signal of the touch input signal. The pressure value of the touch input signal is calculated based on the output signal of the target full-bridge circuit, so that pressure-sensitive detection precision and sensitivity can be improved.

Based on the foregoing embodiments, in this implementation, the processing circuit component 250 is further configured to: before calculating the pressure value of the touch input signal based on the output signal of the target full-bridge circuit, the touch location, and the pressure calculation model, obtain, from a sampled touch location on the touch display screen, a sampled touch input signal that has a known pressure value, select, from the pressure sensor array, a sampled full-bridge circuit of the sampled touch location, and establish the pressure calculation model based on the sampled touch location, the pressure value of the sampled touch input signal, and an output signal of the sampled full-bridge circuit.

Specifically, a plurality of sampled touch locations may be determined on the touch display screen. Corresponding to different sampled touch locations, different sampled full-bridge circuits may be selected for measurement. Alternatively, corresponding to a same sampled touch location, different sampled full-bridge circuits may be selected for a plurality of times of measurement. Alternatively, based on a touch input signal at a same touch location, different sampled full-bridge circuits may be selected for a plurality of times of measurement, to measure an output signal of each half-bridge circuit in the pressure sensor array. Then, the pressure calculation model is established based on the sampled touch location, the pressure value of the touch input signal, and the output signal of the full-bridge circuit (or half-bridge circuits). For example, the pressure calculation model shown in Table 1 is established.

Therefore, in this embodiment of the present invention, the pressure calculation model is pre-established. When the touch location of the touch input signal on the touch display screen is determined, the first half-bridge circuit and the second half-bridge circuit are determined based on the touch location, and the pressure value of the touch input signal is calculated based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

In this implementation, the pressure-sensitive detection apparatus 200 further includes:

a result output component, configured to: output the pressure value of the touch input signal, namely, coordinate information of the touch input signal in a Z direction of the display screen, and further output the touch location of the touch input signal, namely, two-dimensional coordinate information of the touch input signal on an XY plane of the display screen; and an information prompt component, configured to provide prompt information or application information that is corresponding to XYZ coordinate information of the touch input signal.

Embodiment 8

Based on the foregoing embodiments, in this implementation, the pressure sensor is a piezoresistive pressure sensor or a piezoelectric pressure sensor. A pressure strain medium of the pressure sensor is of a serpentine maze layout type.

Figure 13:
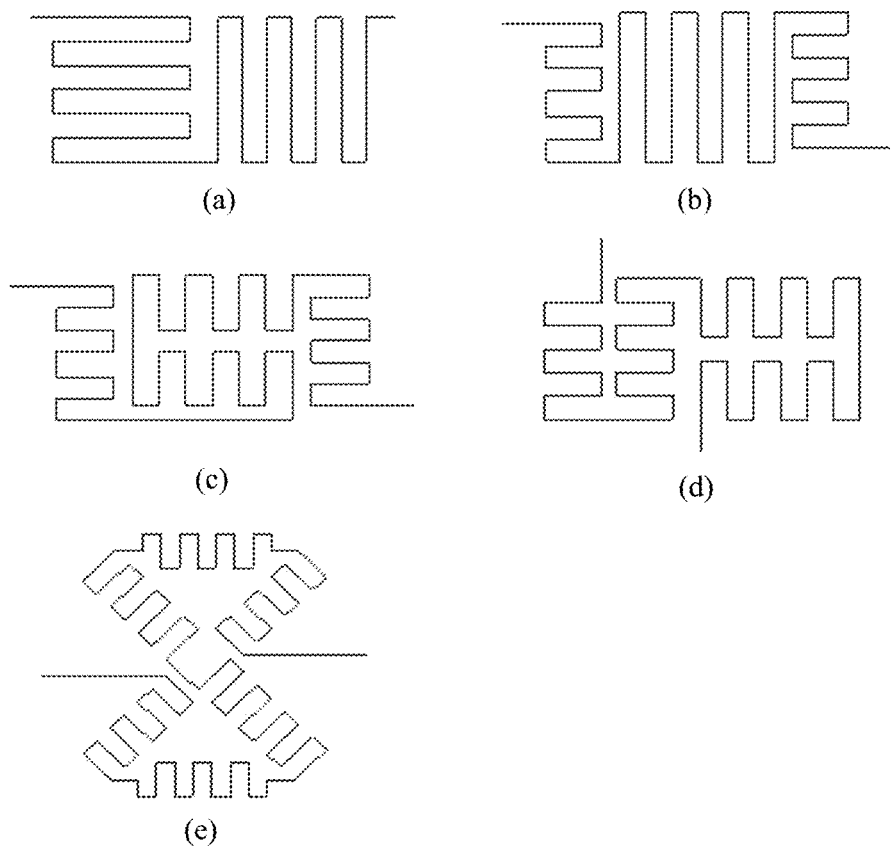
FIG. 13 is a schematic diagram of layout types of a strain medium of a pressure sensor according to an embodiment of the present invention.

Specifically, as shown in FIG. 13, the serpentine maze layout type includes an X-direction layout type and a Y-direction layout type.

In this embodiment of the present invention, the pressure strain medium of the pressure sensor is of the serpentine maze layout type, and the serpentine maze layout type includes the X-direction layout type and the Y-direction layout type. Therefore, the pressure sensor can sense both a change in a vertical direction and a change in a horizontal direction, and can achieve better sensing regardless of a pressure strain generation direction, so that pressure detection sensitivity is improved. In addition, this pressure sensor that is of the serpentine maze layout type is similar to a spring structure, and can achieve excellent release strain regardless of a stretch generation direction. Therefore, an anti-stretch capability can be effectively improved, thereby improving product reliability.

Embodiment 9

Figure 14:
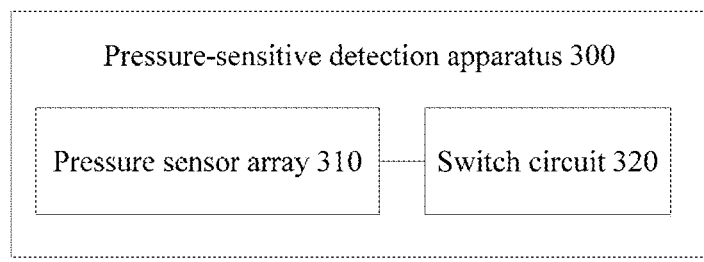
FIG. 14 is still another schematic diagram of a pressure-sensitive detection apparatus according to an embodiment of the present invention.

Based on the foregoing embodiments, referring to FIG. 14, this embodiment discloses a pressure-sensitive detection apparatus 300, and the pressure-sensitive detection apparatus 300 includes:

a pressure sensor array 310, located in a touch display screen, where pressure of a touch input signal on the touch display screen is transferred to the pressure sensor array, each row of the pressure sensor array includes M pressure sensors, the M pressure sensors constitute one half-bridge circuit, the half-bridge circuit includes a first pressure sensor unit and a second pressure sensor unit, a first terminal of the first pressure sensor unit is connected to a power supply, a second terminal of the first pressure sensor unit is connected to a first terminal of the second pressure sensor unit, a second terminal of the second pressure sensor unit is connected to the ground, the second terminal of the first pressure sensor unit is an output terminal of the half-bridge circuit, the first pressure sensor unit and the second pressure sensor unit each include one or more pressure sensors, and M is an integer greater than 2; and a switch circuit 320, including a plurality of switch components that are in a one-to-one correspondence to a plurality of half-bridge circuits in the pressure sensor array 310, where the switch circuit is configured to: when there is a touch input signal on the touch display screen, close a first switch component corresponding to a first half-bridge circuit and a second switch component corresponding to a second half-bridge circuit, where the first half-bridge circuit and the second half-bridge circuit in the pressure sensor array are corresponding to a touch location of the touch input signal; and open all switch components corresponding to remaining half-bridge circuits, so that the first half-bridge circuit and the second half-bridge circuit output signals, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit.

When the touch location of the touch input signal on the display screen is determined, the pressure-sensitive detection apparatus provided in the present invention activates the first half-bridge circuit and the second half-bridge circuit rather than all the half-bridge circuits in the pressure sensor array by using control signals of control terminals of the switch circuit, so that circuit energy consumption can be effectively reduced. In addition, the switch circuit is connected to output terminals of the half-bridge circuits in the pressure sensor array, so that a quantity of cables in an entire circuit can be effectively reduced, thereby reducing circuit costs. In addition, when there is the touch input signal on the touch display screen, the first half-bridge circuit and the second half-bridge circuit in the pressure sensor array that are corresponding to the touch location of the touch input signal are controlled to output the signals. Neither a deformation amount difference of the first half-bridge circuit nor a deformation amount difference of the second half-bridge circuit is 0, and a difference between an output signal of the first half-bridge circuit and an output signal of the second half-bridge circuit is not 0, either. Therefore, a full-bridge circuit including the first half-bridge circuit and the second half-bridge circuit can amplify a pressure-sensitive signal of the touch input signal. Therefore, the pressure-sensitive detection apparatus provided in the present invention can effectively improve sensitivity and precision of pressure-sensitive detection on the touchscreen.

Preferably, the switch circuit further includes control terminals, and control signals of the control terminals are used to: control the first switch component and the second switch component to be closed, and control all the switch components corresponding to the remaining half-bridge circuits to be open.

The pressure sensor array 310 in this embodiment of the present invention is corresponding to the pressure sensor array 3000 described above. For a detailed description, refer to the foregoing descriptions. Details are not described herein again.

Optionally, in this embodiment of the present invention, the pressure-sensitive detection apparatus 300 may further include the differential amplifier, the filter circuit, the analog-to-digital conversion circuit, and the processing circuit component that are described in the foregoing embodiments. For details of related content, refer to the descriptions in the foregoing related embodiments, and the details are not described herein again.

Embodiment 10

Figure 15:
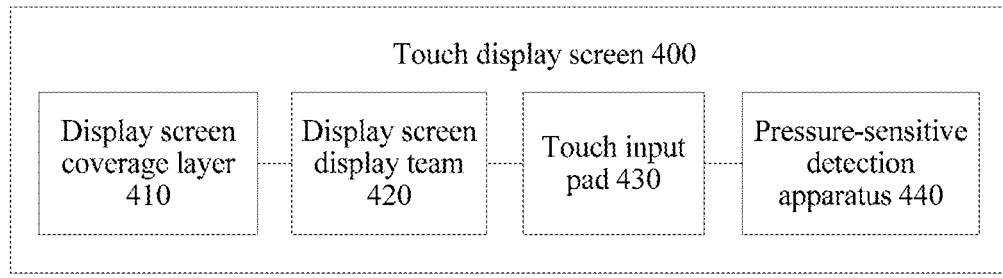
FIG. 15 is a schematic diagram of a touch display screen according to an embodiment of the present invention.

Based on the foregoing embodiments, referring to FIG. 15, this embodiment discloses a touch display screen 400. The touch display screen 400 includes a display screen coverage layer 410, a display screen display module 420, a touch input pad 430, and a pressure-sensitive detection apparatus 440. The pressure-sensitive detection apparatus 440 is located in a support structure inside the touch display screen 400. The pressure-sensitive detection apparatus 440 is corresponding to the pressure-sensitive detection apparatus 200 or the pressure-sensitive detection apparatus 300 that is provided in the embodiments of the present invention. For a detailed description, refer to the foregoing descriptions. For brevity, details are not described herein again.

The touch display screen provided in this embodiment of the present invention can improve pressure-sensitive detection precision and sensitivity.

Based on the foregoing embodiments, in this embodiment, a pressure sensor array included in the pressure-sensitive detection apparatus 440 is located between the display screen coverage layer 410 and the display screen display module 420, or the display screen display module 420 is located between the display screen coverage layer 410 and the pressure sensor array.

Specifically, the touch display screen 400 provided in this embodiment of the present invention may be applied to an electronic device such as a mobile phone, a watch, a computer, or a television.

Embodiment 11

Figure 16:
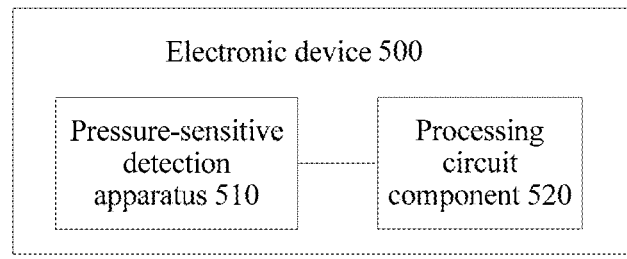
FIG. 16 is a schematic diagram of an electronic device according to an embodiment of the present invention.

Based on the foregoing embodiments, referring to FIG. 16, this embodiment discloses an electronic device 500. The electronic device includes a pressure-sensitive detection apparatus 510 and a processing circuit component 520.

The pressure-sensitive detection apparatus 510 is corresponding to the pressure-sensitive detection apparatus 200 (as shown in FIG. 6) provided in the embodiments of the present invention. For a detailed description, refer to the foregoing descriptions. Details are not described herein again.

The processing circuit component 520 is configured to: when there is a touch input signal on the touch display screen, trigger a first half-bridge circuit and a second half-bridge circuit in the pressure sensor array that are corresponding to a touch location of the touch input signal, to output signals, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit.

The processing circuit component 520 is further configured to: obtain an output signal of a target full-bridge circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

The electronic device provided in this embodiment of the present invention determines, based on the touch location of the touch input signal on the touch display screen, the first half-bridge circuit and the second half-bridge circuit in the pressure sensor array that are corresponding to the touch location. Neither a deformation amount difference of the first half-bridge circuit nor a deformation amount difference of the second half-bridge circuit is 0, and a difference between an output signal of the first half-bridge circuit and an output signal of the second half-bridge circuit is not 0, either. Therefore, the target full-bridge circuit including the first half-bridge circuit and the second half-bridge circuit can amplify a pressure-sensitive signal of the touch input signal. The pressure value of the touch input signal is calculated based on the output signal of the target full-bridge circuit, so that pressure-sensitive detection precision and sensitivity can be improved. Therefore, the electronic device provided in this embodiment of the present invention can effectively improve sensitivity and precision of pressure-sensitive detection on the touchscreen.

In this embodiment, the processing circuit component 520 is configured to determine, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

In this embodiment, the processing circuit component 520 is configured to determine, as the second half-bridge circuit, a half-bridge circuit that has a largest deformation amount difference among half-bridge circuits other than the first half-bridge circuit in the pressure sensor array.

Based on the foregoing embodiments, in this implementation, the processing circuit component 520 is configured to trigger, based on preset information and the touch location, the first half-bridge circuit and the second half-bridge circuit in the pressure sensor array that are corresponding to the touch location, to output the signals. The preset information includes a correspondence between a touch location and a number of a row in which a half-bridge circuit is located.

Specifically, as shown in Table 2, the preset information may be in a form of a mapping table.

TABLE 2

| Touch location | Row number of a first half-bridge circuit | Row number of a second half-bridge circuit |
| --- | --- | --- |
| M1 | 5 | 3 |
| M2 | 2 | 4 |
| M3 | Row_Num1 | Row_Num2 |
| ... | ... | ... |

It can be learned from Table 2 that, a title row in Table 2 includes three objects: the touch location, the row number of the first half-bridge circuit, and the row number of the second half-bridge.

For example, if preset information of the pressure sensor array 3000 shown in FIG. 6 is shown in Table 2, when the touch location of the touch input signal on the touch display screen is M1, based on Table 2, the half-bridge circuit 3500 in the fifth row of the pressure sensor array 3000 is selected as the first half-bridge circuit, and the half-bridge circuit 3300 in the third row of the pressure sensor array 3000 is selected as the second half-bridge circuit. For another example, when the touch location of the touch input signal on the touch display screen is M2, based on Table 2, the half-bridge circuit 3200 in the second row of the pressure sensor array 3000 is selected as the first half-bridge circuit, and the half-bridge circuit 3400 in the fourth row of the pressure sensor array 3000 is selected as the second half-bridge circuit. If the touch location is M3, a half-bridge circuit whose row number is Row_Num1 in the pressure sensor array 3000 is selected as the first half-bridge circuit, and a half-bridge circuit whose row number is Row_Num2 in the pressure sensor array 3000 is selected as the second half-bridge circuit; and so on.

It should be understood that, the preset information shown in Table 2 may be obtained by analyzing a force-bearing status of a pressure sensor, in the pressure sensor array 3000, under pressure at different touch locations.

It should be further understood that Table 2 is merely used as an example rather than a limitation. Alternatively, the preset information may be represented in other forms, such as a database.

Based on the foregoing embodiments, in this implementation, the processing circuit component 520 is further configured to: before calculating the pressure value of the touch input signal based on the output signal of the target full-bridge circuit, the touch location, and the pressure calculation model, obtain, from a sampled touch location on the touch display screen, a sampled touch input signal that has a known pressure value, select, from the pressure sensor array, a sampled full-bridge circuit corresponding to the sampled touch location, and establish the pressure calculation model based on the sampled touch location, the pressure value of the sampled touch input signal, and an output signal of the sampled full-bridge circuit.

Specifically, the pressure calculation model is shown in Table 1.

Therefore, the electronic device provided in this embodiment of the present invention pre-establishes the pressure calculation model, and when the touch location of the touch input signal on the touch display screen is determined, determines the first half-bridge circuit and the second half-bridge circuit based on the touch location, and calculates the pressure value of the touch input signal based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

Figure 17:
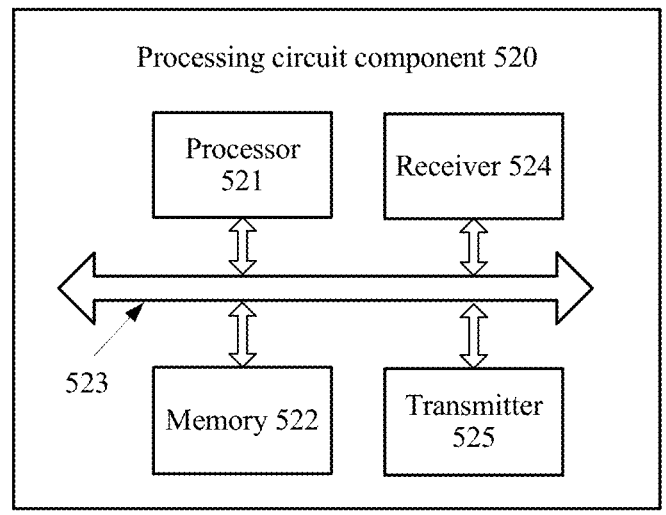
FIG. 17 is another schematic diagram of an electronic device according to an embodiment of the present invention.

Specifically, the processing circuit component 520 in this embodiment of the present invention may be implemented by a processor or a processor-related circuit in the electronic device 500. FIG. 17 is a schematic block diagram of the processing circuit component 520 in this embodiment of the present invention. The processing circuit component 520 includes a processor 521, a memory 522, a bus system 523, a receiver 524, and a transmitter 525. The processor 521, the memory 522, the receiver 524, and the transmitter 525 are connected to each other by using the bus system 523. The memory 522 is configured to store an instruction. The processor 521 is configured to execute the instruction stored in the memory 522, to control the receiver 524 to receive a signal and control the transmitter 525 to send a signal. By executing the instruction stored in the memory 522, the processor 521 is configured to perform the actions performed by the processing circuit component 520 described above. For brevity, details are not described herein again.

The electronic device 500 provided in this embodiment of the present invention includes various terminals with a touchscreen, such as a smartphone, a smartwatch, a notebook computer, and a television.

Embodiment 12

Based on the foregoing embodiments, referring to FIG. 18, this embodiment discloses a method 600 for performing pressure-sensitive detection on a touch display screen. A pressure sensor array is distributed in the touch display screen, and the pressure sensor array is corresponding to the pressure sensor array 3000 provided in the embodiments of the present invention. For a detailed description, refer to the foregoing descriptions. Details are not described herein again. The method 600 includes the following steps:

S610. Determine a touch location of a touch input signal on the touch display screen.

S620. Determine, based on the touch location, a first half-bridge circuit and a second half-bridge circuit in the pressure sensor array that are corresponding to the touch location, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit.

S630. Obtain an output signal of a target full-bridge circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

Specifically, in S630, differential amplification may be performed on an output signal of the first half-bridge circuit and an output of the second half-bridge circuit by using a differential amplifier, to obtain the output signal of the target full-bridge circuit.

In this embodiment of the present invention, the first half-bridge circuit and the second half-bridge circuit in the pressure sensor array that are corresponding to the touch location are determined based on the touch location of the touch input signal on the touch display screen. Neither a deformation amount difference of the first half-bridge circuit nor a deformation amount difference of the second half-bridge circuit is 0, and a difference between the output signal of the first half-bridge circuit and the output signal of the second half-bridge circuit is not 0, either. Therefore, the target full-bridge circuit including the first half-bridge circuit and the second half-bridge circuit can amplify a pressure-sensitive signal of the touch input signal. The pressure value of the touch input signal is calculated based on the output signal of the target full-bridge circuit, so that pressure-sensitive detection precision and sensitivity can be improved.

Based on the foregoing embodiments, in this implementation, in S620, the determining, based on the touch location, a first half-bridge circuit that is corresponding to the touch location in the pressure sensor array includes:

determining, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

Based on the foregoing embodiments, in this implementation, in S620, the determining, based on the touch location, a second half-bridge circuit that is corresponding to the touch location in the pressure sensor array includes:

determining, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

Based on the foregoing embodiments, in this implementation, in S620, triggering, based on the touch location, the first half-bridge circuit and the second half-bridge circuit in the pressure sensor array that are corresponding to the touch location, to output signals includes:

triggering, based on preset information and the touch location, the first half-bridge circuit and the second half-bridge circuit in the pressure sensor array that are corresponding to the touch location, to output the signals, where the preset information includes a correspondence between a touch location and a number of a row in which a half-bridge circuit is located.

Specifically, the preset information is shown in Table 2. For a detailed description, refer to the foregoing descriptions provided with reference to Table 2. Details are not described herein again.

In this embodiment of the present invention, the preset information may be pre-obtained by using a simulation experiment.

Based on the foregoing embodiments, in this implementation, the method 600 further includes:

determining a sampled touch location on the display screen, receiving a sampled touch input signal that has a known pressure value and that is input at the sampled touch location, selecting, from the pressure sensor array, a sampled full-bridge circuit of the sampled touch location, and establishing the pressure calculation model based on the sampled touch location, the pressure value of the sampled touch input signal, and an output signal of the sampled full-bridge circuit.

Specifically, the pressure calculation model is shown in Table 1. For a detailed description, refer to the foregoing descriptions provided with reference to Table 1. Details are not described herein again.

Therefore, in this embodiment of the present invention, the pressure calculation model is pre-established. When the touch location of the touch input signal on the touch display screen is determined, the first half-bridge circuit and the second half-bridge circuit are determined based on the touch location, and the pressure value of the touch input signal is calculated based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

Embodiment 13

Based on the foregoing embodiments, referring to FIG. 19, this embodiment of the present invention discloses a pressure-sensitive detection apparatus 700. The pressure-sensitive detection apparatus 700 is configured to perform the method 600 that is for performing pressure-sensitive detection on a touch display screen and that is provided in this embodiment of the present invention. The pressure-sensitive detection apparatus 700 may include modules configured to perform the method 600, and the pressure-sensitive detection apparatus 700 includes:

a pressure sensor array 710, where the pressure sensor array 710 is corresponding to the pressure sensor array 3000 provided in the embodiments of the present invention; and for a detailed description, refer to the foregoing descriptions, and details are not described herein again;

a touch location determining module 720, configured to determine a touch location of a touch input signal on the touch display screen;

a bridge circuit selection module 730, configured to: determine, based on the touch location determined by the determining module 720, a first half-bridge circuit and a second half-bridge circuit in the pressure sensor array 710 that are corresponding to the touch location, where a deformation amount generated when pressure is applied to a first pressure sensor unit in the first half-bridge circuit is less than a deformation amount generated when the pressure is applied to a second pressure sensor unit in the first half-bridge circuit, and a deformation amount generated when the pressure is applied to a first pressure sensor unit in the second half-bridge circuit is greater than a deformation amount generated when the pressure is applied to a second pressure sensor unit in the second half-bridge circuit; and a pressure calculation module 740, configured to: obtain an output signal of a target full-bridge circuit, where the target full-bridge circuit indicates a full-bridge circuit including the first half-bridge circuit and the second half-bridge circuit; and calculate a pressure value of the touch input signal based on the output signal of the target full-bridge circuit, the touch location, and a pressure calculation model, where the pressure calculation model includes a mathematical relationship between a sampled touch location on the touch display screen, a pressure value of a sampled touch input signal at the sampled touch location and an output signal of a sampled full-bridge circuit corresponding to the sampled touch location.

The pressure calculation module 740 is specifically configured to perform differential amplification on an output signal of the first half-bridge circuit and an output of the second half-bridge circuit by using a differential amplifier, to obtain the output signal of the target full-bridge circuit.

The pressure-sensitive detection apparatus 700 provided in this embodiment of the present invention determines, based on the touch location of the touch input signal on the touch display screen, the first half-bridge circuit and the second half-bridge circuit in the pressure sensor array that are corresponding to the touch location. Neither a deformation amount difference of the first half-bridge circuit nor a deformation amount difference of the second half-bridge circuit is 0, and a difference between the output signal of the first half-bridge circuit and the output signal of the second half-bridge circuit is not 0, either. Therefore, the target full-bridge circuit including the first half-bridge circuit and the second half-bridge circuit can amplify a pressure-sensitive signal of the touch input signal. The pressure value of the touch input signal is calculated based on the output signal of the target full-bridge circuit, so that pressure-sensitive detection precision and sensitivity can be improved.

Based on the foregoing embodiments, in this embodiment, the bridge circuit selection module 730 is configured to determine, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

Based on the foregoing embodiments, in this embodiment, the bridge circuit selection module 730 is configured to determine, as the first half-bridge circuit, a half-bridge circuit that has a largest deformation amount difference in the pressure sensor array, where the deformation amount difference indicates a difference between a deformation amount of the first pressure sensor unit and a deformation amount of the second pressure sensor unit in a same half-bridge circuit.

Based on the foregoing embodiments, in this embodiment, the pressure-sensitive detection apparatus 700 further includes:

a model establishment module 750, configured to: determine a sampled touch location on the display screen, receive a sampled touch input signal that has a known pressure value and that is input at the sampled touch location, select, from the pressure sensor array, a sampled full-bridge circuit of the sampled touch location, and establish the pressure calculation model based on the sampled touch location, the pressure value of the sampled touch input signal, and an output signal of the sampled full-bridge circuit.

Therefore, the pressure-sensitive detection apparatus 700 provided in this embodiment of the present invention pre-establishes the pressure calculation model, and when the touch location of the touch input signal on the touch display screen is determined, determines the first half-bridge circuit and the second half-bridge circuit based on the touch location, and calculates the pressure value of the touch input signal based on the output signal of the target full-bridge circuit including the first half-bridge circuit and the second half-bridge circuit, the touch location, and the pre-established pressure calculation model. In this manner, sensitivity and precision of pressure detection on the display screen can be improved to some degree.

Specifically, the touch location determining module 720, the bridge circuit selection module 730, the pressure calculation module 740, and the model establishment module 750 in this embodiment of the present invention all may be implemented by a processor or a processor-related circuit in the pressure-sensitive detection apparatus 700, for example, may be implemented by the apparatus shown in FIG. 17. By executing an instruction in a memory, the processor performs the actions performed by the touch location determining module 720, the bridge circuit selection module 730, the pressure calculation module 740, and the model establishment module 750.

It should be understood that, sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the described system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, namely, may be located in one position, or may be distributed on a plurality of network units. Some or all of the units may be selected based on an actual requirement, to achieve the objectives of the solutions in the embodiments.

In addition, function units in the embodiments of the present invention may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of the embodiments of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A pressure-sensitive detection apparatus, comprising:
a pressure sensor array, wherein each row of the pressure sensor array comprises M pressure sensors, wherein the M pressure sensors constitute one half-bridge circuit, wherein the half-bridge circuit comprises a first pressure sensor component and a second pressure sensor component, wherein a first terminal of the first pressure sensor component is connected to a power supply, wherein a second terminal of the first pressure sensor component is connected to a first terminal of the second pressure sensor component, wherein a second terminal of the second pressure sensor component is connected to the ground, wherein the second terminal of the first pressure sensor component is an output terminal of the half-bridge circuit, wherein the first pressure sensor component and the second pressure sensor component each comprise one or more pressure sensors, wherein M is an integer greater than 2, and wherein:

the pressure sensor array is located in a touch display screen, and pressure of a touch input signal on the touch display screen is transferred to the pressure sensor array; and when there is a touch input signal on the touch display screen, a first half-bridge circuit and a second half-bridge circuit in the pressure sensor array that correspond to a touch location of the touch input signal output signals, wherein a deformation amount generated when pressure is applied to a first pressure sensor component in the first half-bridge circuit is less than a deformation amount generated when the pressure is applied to a second pressure sensor component in the first half-bridge circuit, and wherein a deformation amount generated when the pressure is applied to a first pressure sensor component in the second half-bridge circuit is greater than a deformation amount generated when the pressure is applied to a second pressure sensor component in the second half-bridge circuit.

2. The pressure-sensitive detection apparatus according to claim 1, wherein the first half-bridge circuit has a largest deformation amount difference in the pressure sensor array, and wherein the deformation amount difference indicates a difference between a deformation amount of the first pressure sensor component and a deformation amount of the second pressure sensor component in a same half-bridge circuit.

3. The pressure-sensitive detection apparatus according to claim 2, wherein the second half-bridge circuit has a largest deformation amount difference among half-bridge circuits other than the first half-bridge circuit in the pressure sensor array.

4. The pressure-sensitive detection apparatus according to claim 1, wherein in a half-bridge circuit in an ith row of the pressure sensor array, the corresponding first pressure sensor component and the corresponding second pressure sensor component are respectively located in the middle and on both sides of the $i^{th}$ row, wherein in a half-bridge circuit in a $j^{th}$ row of the pressure sensor array, the corresponding first pressure sensor component and the corresponding second pressure sensor component are respectively located on a left side and a right side of the $j^{th}$ row, and wherein the ith row and the $j^{th}$ row are any two adjacent rows of the pressure sensor array.

5. The pressure-sensitive detection apparatus according to claim 1, wherein the pressure-sensitive detection apparatus further comprises:

a switch circuit, wherein the switch circuit comprises a plurality of switch components that are in a one-to-one correspondence to a plurality of half-bridge circuits in the pressure sensor array, wherein a first switch component corresponding to the first half-bridge circuit is closed, wherein a second switch component corresponding to the second half-bridge circuit is closed, wherein all switch components corresponding to remaining half-bridge circuits are open, and wherein the first half-bridge circuit and the second half-bridge circuit output the signals.

6. The pressure-sensitive detection apparatus according to claim 1, wherein the pressure-sensitive detection apparatus further comprises:

a differential amplifier, wherein two input terminals of the differential amplifier are connected to an output terminal of the first half-bridge circuit and an output terminal of the second half-bridge circuit in a one-to-one manner.

7. The pressure-sensitive detection apparatus according to claim 1, wherein the pressure sensor is a piezoresistive pressure sensor or a piezoelectric pressure sensor.

8. A touch display screen, wherein the touch display screen comprises a display screen coverage layer, a display screen display, a touch input pad, and a pressure-sensitive detection apparatus, and wherein the pressure-sensitive detection apparatus is located in a support structure inside the touch display screen, wherein the pressure-sensitive detection apparatus comprises:

a pressure sensor array, wherein each row of the pressure sensor array comprises M pressure sensors, wherein the M pressure sensors constitute one half-bridge circuit, wherein the half-bridge circuit comprises a first pressure sensor component and a second pressure sensor component, wherein a first terminal of the first pressure sensor component is connected to a power supply, wherein a second terminal of the first pressure sensor component is connected to a first terminal of the second pressure sensor component, wherein a second terminal of the second pressure sensor component is connected to the ground, wherein the second terminal of the first pressure sensor component is an output terminal of the half-bridge circuit, wherein the first pressure sensor component and the second pressure sensor component each comprise one or more pressure sensors, wherein M is an integer greater than 2, and wherein:

the pressure sensor array is located in a touch display screen, and pressure of a touch input signal on the touch display screen is transferred to the pressure sensor array; and when there is a touch input signal on the touch display screen, a first half-bridge circuit and a second half-bridge circuit in the pressure sensor array that correspond to a touch location of the touch input signal output signals, wherein a deformation amount generated when pressure is applied to a first pressure sensor component in the first half-bridge circuit is less than a deformation amount generated when the pressure is applied to a second pressure sensor component in the first half-bridge circuit, and wherein a deformation amount generated when the pressure is applied to a first pressure sensor component in the second half-bridge circuit is greater than a deformation amount generated when the pressure is applied to a second pressure sensor component in the second half-bridge circuit.

9. The touch display screen according to claim 8, wherein the first half-bridge circuit has a largest deformation amount difference in the pressure sensor array, and wherein the deformation amount difference indicates a difference between a deformation amount of the first pressure sensor component and a deformation amount of the second pressure sensor component in a same half-bridge circuit.

10. The pressure-sensitive detection apparatus according to claim 9, wherein the second half-bridge circuit has a largest deformation amount difference among half-bridge circuits other than the first half-bridge circuit in the pressure sensor array.

11. The touch display screen according to claim 8, wherein in a half-bridge circuit in an $i^{th}$ row of the pressure sensor array, the corresponding first pressure sensor component and the corresponding second pressure sensor component are respectively located in the middle and on both sides of the $i^{th}$ row, wherein in a half-bridge circuit in a $j^{th}$ row of the pressure sensor array, the corresponding first pressure sensor component and the corresponding second pressure sensor component are respectively located on a left side and a right side of the $j^{th}$ row, and wherein the $i^{th}$ row and the $j^{th}$ row are any two adjacent rows of the pressure sensor array.

12. The touch display screen according to claim 8, wherein the pressure-sensitive detection apparatus further comprises:
a switch circuit, wherein the switch circuit comprises a plurality of switch components that are in a one-to-one correspondence to a plurality of half-bridge circuits in the pressure sensor array, wherein a first switch component corresponding to the first half-bridge circuit is closed, wherein a second switch component corresponding to the second half-bridge circuit is closed, wherein all switch components corresponding to remaining half-bridge circuits are open, and wherein the first half-bridge circuit and the second half-bridge circuit output the signals.

13. The touch display screen according to claim 8, wherein the pressure-sensitive detection apparatus further comprises:
a differential amplifier, wherein two input terminals of the differential amplifier are connected to an output terminal of the first half-bridge circuit and an output terminal of the second half-bridge circuit in a one-to-one manner.

14. The touch display screen according to claim 8, wherein the pressure sensor is a piezoresistive pressure sensor or a piezoelectric pressure sensor.

15. The touch display screen according to claim 8, wherein the pressure sensor array in the pressure-sensitive detection apparatus is located between the display screen coverage layer and the display screen display, or the display screen display is located between the display screen coverage layer and the pressure sensor array.

16. An electronic device, wherein the electronic device comprises at least one processor and a pressure-sensitive detection apparatus comprising a pressure sensor array located in a touch display screen, wherein each row of the pressure sensor array comprises M pressure sensors, wherein the M pressure sensors constitute one half-bridge circuit, wherein the half-bridge circuit comprises a first pressure sensor component and a second pressure sensor component, wherein a first terminal of the first pressure sensor component is connected to a power supply, wherein a second terminal of the first pressure sensor component is connected to a first terminal of the second pressure sensor component, wherein a second terminal of the second pressure sensor component is connected to the ground, wherein the second terminal of the first pressure sensor component is an output terminal of the half-bridge circuit, wherein the first pressure sensor component and the second pressure sensor component each comprise one or more pressure sensors, wherein M is an integer greater than 2, wherein:
the at least one processor is configured to:
when there is a touch input signal on the touch display screen, trigger a first half-bridge circuit and a second half-bridge circuit in the pressure sensor array that correspond to a touch location of the touch input signal to output signals, wherein a deformation amount generated when pressure is applied to a first pressure sensor component in the first half-bridge circuit is less than a deformation amount generated when the pressure is applied to a second pressure sensor component in the first half-bridge circuit, and wherein a deformation amount generated when the pressure is applied to a first pressure sensor component in the second half-bridge circuit is greater than a deformation amount generated when the pressure is applied to a second pressure sensor component in the second half-bridge circuit;
obtain an output signal of a target full-bridge circuit, wherein the target full-bridge circuit indicates a full-bridge circuit comprising the first half-bridge circuit and the second half-bridge circuit; and
calculate a pressure value of the touch input signal based on the output signal of the target full-bridge circuit, the touch location, and a pressure calculation model, wherein the pressure calculation model comprises a mathematical relationship between a sampled touch location on the touch display screen, a pressure value of a sampled touch input signal at the sampled touch location, and an output signal of a sampled full-bridge circuit corresponding to the sampled touch location.

17. The electronic device according to claim 16, wherein the at least one processor is configured to:
determine, as the first half-bridge circuit, a half-bridge circuit that has a largest deformation amount difference in the pressure sensor array, wherein the deformation amount difference indicates a difference between a deformation amount of the first pressure sensor component and a deformation amount of the second pressure sensor component in a same half-bridge circuit.

18. The electronic device according to claim 17, wherein the at least one processor is configured to:
determine, as the second half-bridge circuit, a half-bridge circuit that has a largest deformation amount difference among half-bridge circuits other than the first half-bridge circuit in the pressure sensor array.

19. The electronic device according to claim 16, wherein the at least one processor is further configured to:
before calculating the pressure value of the touch input signal based on the output signal of the target full-bridge circuit, the touch location, and the pressure calculation model, obtain, from a sampled touch location on the touch display screen, a sampled touch input signal that has a known pressure value;
select, from the pressure sensor array, a sampled full-bridge circuit corresponding to the sampled touch location; and
establish the pressure calculation model based on the sampled touch location, the pressure value of the sampled touch input signal, and an output signal of the sampled full-bridge circuit.

20. The electronic device according to claim 16, wherein, the first half-bridge circuit has a largest deformation amount difference in the pressure sensor array, and wherein the deformation amount difference indicates a difference between a deformation amount of the first pressure sensor component and a deformation amount of the second pressure sensor component in a same half-bridge circuit.

* * * * *

UNITED STATES PATENT AND TRADEMARK OFFICE
CERTIFICATE OF CORRECTION

PATENT NO. : 10,852,873 B2  
APPLICATION NO. : 16/234108  
DATED : December 1, 2020  
INVENTOR(S) : Jiang Liu, Jingdong Wu and Zeshi Zhang Page 1 of 1

It is certified that error appears in the above-identified patent and that said Letters Patent is hereby corrected as shown below:

In the Claims

In Column 39, Line 38, in Claim 4, delete "ith" and insert -- $i^{th}$ --, therefor.

In Column 39, Line 46, in Claim 4, delete "ith" and insert -- $i^{th}$ --, therefor.

In Column 40, Line 57, in Claim 10, delete "pressure-sensitive detection apparatus" and insert -- touch display screen --, therefor.

In Column 41, Line 35, in Claim 15, delete "display," and insert -- display module, --, therefor.

In Column 41, Line 36, in Claim 15, delete "display" and insert -- display module --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*